United States Patent
Tanaka et al.

(10) Patent No.: US 8,597,412 B2
(45) Date of Patent: Dec. 3, 2013

(54) $CO_2$ RECOVERY APPARATUS AND $CO_2$ RECOVERY METHOD

(75) Inventors: Hiroshi Tanaka, Hiroshima (JP); Toru Takashina, Hiroshima (JP); Tsuyoshi Oishi, Hiroshima (JP); Masaki Iijima, Hiroshima (JP); Tomio Mimura, Hyogo (JP); Kouki Ogura, Hyogo (JP); Yasuyuki Yagi, Hyogo (JP)

(73) Assignees: Mitsubishi Heavy Industries, Ltd., Tokyo (JP); The Kansai Electric Power Co., Ltd., Osaka-shi (JP)

( * ) Notice: Subject to any disclaimer, the term of this patent is extended or adjusted under 35 U.S.C. 154(b) by 572 days.

(21) Appl. No.: 12/863,348

(22) PCT Filed: Feb. 20, 2009

(86) PCT No.: PCT/JP2009/053052
§ 371 (c)(1),
(2), (4) Date: Jul. 16, 2010

(87) PCT Pub. No.: WO2009/104744
PCT Pub. Date: Aug. 27, 2009

(65) Prior Publication Data
US 2011/0041685 A1 Feb. 24, 2011

(30) Foreign Application Priority Data
Feb. 22, 2008 (JP) ................... 2008-042041

(51) Int. Cl.
*B01D 53/14* (2006.01)
(52) U.S. Cl.
USPC .............. 95/183; 95/199; 95/223; 95/236; 95/193; 96/234; 96/242
(58) Field of Classification Search
USPC .............. 95/236, 183, 193, 199, 223; 96/234, 96/242
See application file for complete search history.

(56) References Cited

U.S. PATENT DOCUMENTS

| 2,878,099 A | 3/1959 | Breuing et al. |
| 3,927,178 A | 12/1975 | Jordan et al. |

(Continued)

FOREIGN PATENT DOCUMENTS

| EA | 008851 B1 | 8/2007 |
| JP | 54-120280 A | 9/1979 |

(Continued)

OTHER PUBLICATIONS

Decision to Grant a Patent for an Invention dated Sep. 26, 2011, issued in corresponding Russian Patent Application No. 2010134942.

(Continued)

*Primary Examiner* — Duane Smith
*Assistant Examiner* — Joubert X Glover
(74) *Attorney, Agent, or Firm* — Westerman, Hattori, Daniels & Adrian, LLP

(57) ABSTRACT

A $CO_2$ recovery apparatus according to the present invention includes: an absorber (1003) that brings $CO_2$-containing flue gas (1001A) into counter-current contact with $CO_2$ absorbent (1002) to reduce $CO_2$, and a regenerator (1005) that regenerates rich solution (1004) that has absorbed $CO_2$, in which lean solution (1006) having $CO_2$ reduced in the regenerator (1005) is reused in the absorber (1003). The absorber (1003) further includes a $CO_2$ absorbing unit (1010) that recovers $CO_2$ contained in the flue gas (1001A), and the $CO_2$ absorbent (1002) that has absorbed $CO_2$ is extracted from a rich side of the $CO_2$ absorbing unit (1010) to exterior, cooled, and then supplied to a position nearer to a lean side of the absorber (1003) with respect to the position at which the $CO_2$ absorbent (1002) is extracted.

22 Claims, 12 Drawing Sheets

(56) References Cited

U.S. PATENT DOCUMENTS

| | | | |
|---|---|---|---|
| 4,336,233 A * | 6/1982 | Appl et al. | 423/228 |
| 4,997,630 A * | 3/1991 | Wagner et al. | 423/228 |
| 4,999,031 A * | 3/1991 | Gerhardt et al. | 95/162 |
| 5,603,908 A * | 2/1997 | Yoshida et al. | 423/220 |
| 5,904,908 A * | 5/1999 | Suzuki et al. | 423/228 |
| 6,666,908 B2 * | 12/2003 | Cadours et al. | 95/166 |
| 6,800,120 B1 | 10/2004 | Won et al. | |
| 7,699,914 B1 * | 4/2010 | Morrow et al. | 96/234 |
| 2009/0068078 A1 | 3/2009 | Grobys et al. | |

FOREIGN PATENT DOCUMENTS

| | | | |
|---|---|---|---|
| JP | 60-110321 A | 6/1985 | |
| JP | 60-118223 A | 6/1985 | |
| JP | 3-193116 A | 8/1991 | |
| JP | 4-141217 A | 5/1992 | |
| JP | 4-161226 A | 6/1992 | |
| JP | 10-202053 A | 8/1998 | |
| JP | 3416443 B2 | 6/2003 | |
| JP | 2007-190553 A | 8/2007 | |
| JP | 2007-284272 A | 11/2007 | |
| JP | 2007-284273 A | 11/2007 | |
| SU | 491235 A3 | 11/1975 | |
| SU | 1725988 A1 | 4/1992 | |
| WO | 01/05489 A1 | 1/2001 | |
| WO | 2005/069965 A2 | 8/2005 | |
| WO | 2007/019632 A1 | 2/2007 | |
| WO | 2007/104800 A1 | 9/2007 | |
| WO | 2007/107004 A1 | 9/2007 | |

OTHER PUBLICATIONS

Supplementary European Search Report dated Jan. 26, 2012, issued in corresponding European Patent Application No. 09712867.2.

International Search Report of PCT/JP2009/053052, Mailing Date of Apr. 21, 2009.

Canadian Notice of Allowance dated Jun. 18, 2012, issued in corresponding Canadian Patent Application No. 2,711,435. (1 page).

European Office Action dated Oct. 26, 2012, issued in corresponding European Patent Application No. 09 712 8672 (6 Pages).

Kohl, A.L. et al.,"Gas PurificationFLOW SYSTEMS", Gas Purification, Gulf Publishing Company, Houston, Texas, vol. ED.5, Jan. 1, 1997, pp. 57-59, XP002534459 (Cited in European Office Action dated Oct. 26, 2012).

Japanese Office Action dated Dec. 11, 2012, issued in corresponding Japanese patent application No. 2009-554399, W/ English translation.

Japanese Office Action dated Aug. 6, 2013, issued in corresponding Japanese Patent Application No. 2009-554399 with English translation (11 pages).

* cited by examiner

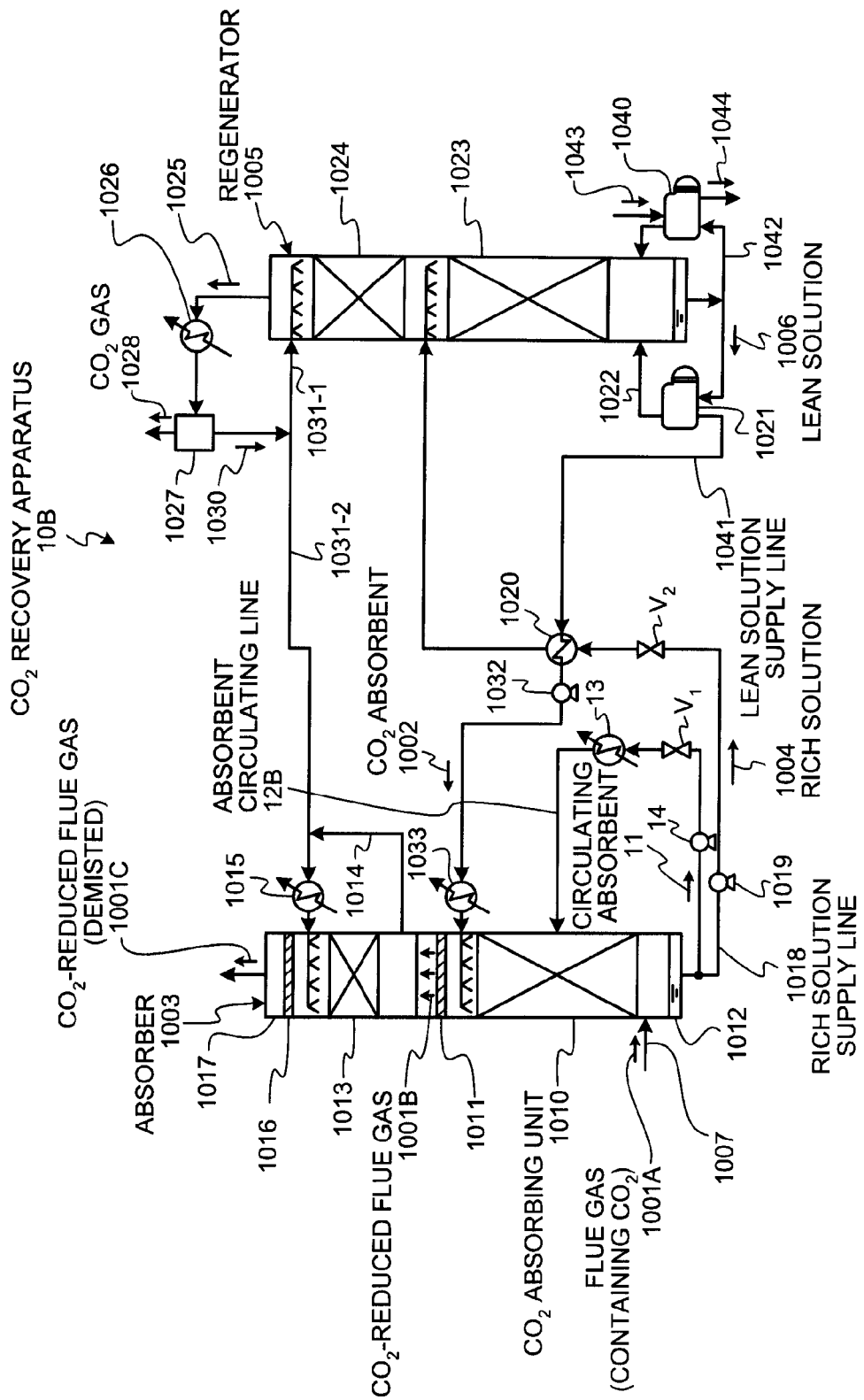

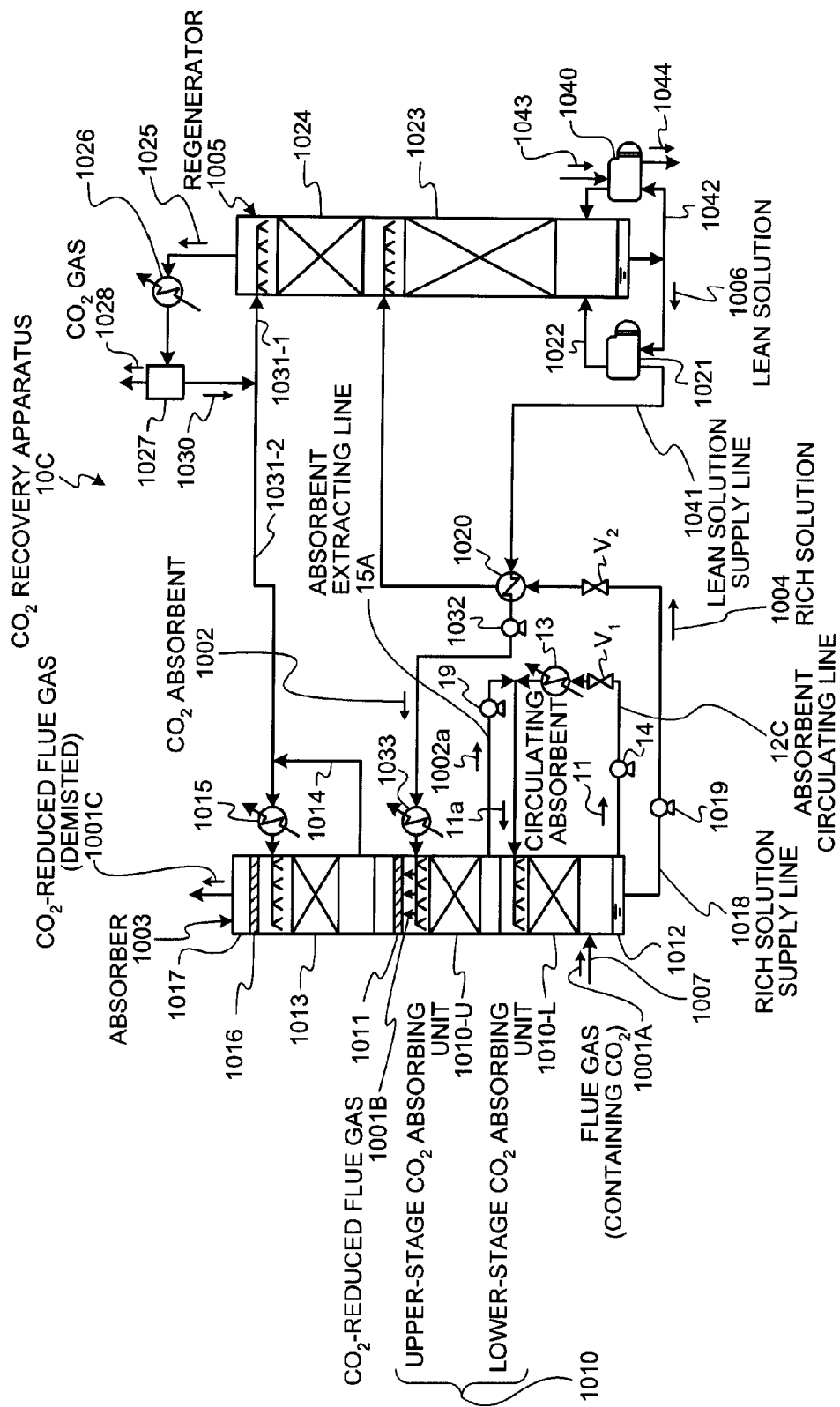

FIG.6

|  | TEST EXAMPLE 1 | COMPARATIVE EXAMPLE 1 |
|---|---|---|
| TEMPERATURE | 44 °C | 51 °C |
| MASS FLOW RATIO | 0.91 | 1.0 [REFERENCE VALUE] |
| $CO_2$ LOADING RATIO | 1.08 | 1.0 [REFERENCE VALUE] |

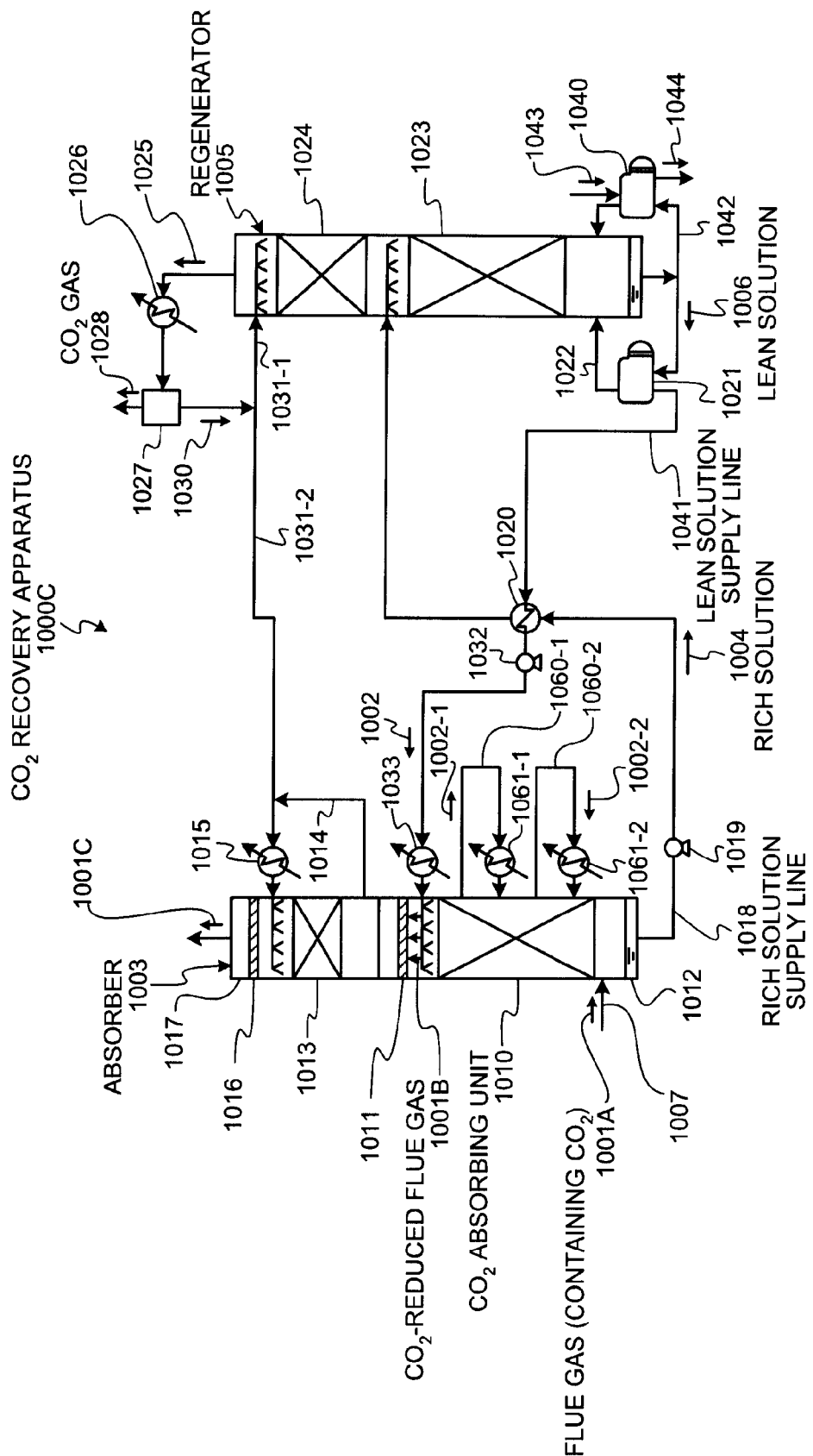

CO₂ RECOVERY APPARATUS AND CO₂ RECOVERY METHOD

TECHNICAL FIELD

The present invention relates to a $CO_2$ recovery apparatus and a $CO_2$ recovery method for circulating $CO_2$ absorbent that has absorbed $CO_2$ contained in flue gas in an absorber to allow the $CO_2$ absorbent to absorb a greater amount of $CO_2$, thus increasing the $CO_2$ concentration in the $CO_2$ absorbent and reducing the circulation mass flow of the $CO_2$ absorbent, so that the amount of steam required in regenerating the $CO_2$ absorbent in a regenerator is reduced, resulting in saved energy.

BACKGROUND ART

The greenhouse effect of $CO_2$ has been pointed out as one of the causes of the global warming, and it has become an international urgent task to provide countermeasures to $CO_2$ to protect the global environment against the warming. $CO_2$ is generated by any human activities involving the combustion of fossil fuels, and there are increasing demands for suppressing emissions created thereby. Along with such an increasing demand, as countermeasures are being sought for increased productions of raw materials such as urea (a chemical application) and crude oil, and for global warming, resulting in studies energetically being made on a method for reducing and recovering $CO_2$ contained in flue gas by bringing the flue gas emitted from a boiler in contact with an amine-based $CO_2$ absorbent, and storing recovered $CO_2$ without releasing it into the air. Applications include power plants that consume a large amount of fossil fuels, such as a thermal plant.

As a practical method for recovering and storing a large amount of $CO_2$ contained in flue gas, a chemical absorption technique in which $CO_2$ is brought into contact with a $CO_2$ absorbent such as aqueous amine solution is a known method. In a method using the $CO_2$ absorbent, flue gas is brought into contact with the $CO_2$ absorbent in an absorber to reduce and to recover $CO_2$ contained in the flue gas, the absorbent that has absorbed $CO_2$ is heated in a regenerator so as to isolate $CO_2$ and to regenerate the absorbent, and the absorbent is circulated back to the absorber for reuse (Patent Document 1).

FIG. 10 is a schematic of an example of a structure of a conventional $CO_2$ recovery apparatus 1000A. As illustrated in FIG. 10, the conventional $CO_2$ recovery apparatus 1000A includes: an absorber 1003 in which $CO_2$-containing flue gas 1001A emitted from an industrial facility is brought into contact with $CO_2$ absorbent 1002 to reduce $CO_2$ contained in the $CO_2$-containing flue gas 1001A, and a regenerator 1005 that causes the $CO_2$ absorbent that has absorbed $CO_2$ (hereinafter, the $CO_2$ absorbent that has absorbed $CO_2$ is referred to as "rich solution") 1004 to release $CO_2$ and regenerates the $CO_2$ absorbent 1002. In this unit, the $CO_2$ absorbent having $CO_2$ reduced and being regenerated in the regenerator 1005 (hereinafter, the $CO_2$ absorbent having $CO_2$ reduced and being regenerated in the regenerator is referred to as "lean solution") 1006 is reused as the $CO_2$ absorbent 1002 in the absorber 1003.

For example, the $CO_2$-containing flue gas 1001A that is the flue gas emitted from an industrial facility, such as a boiler or a gas turbine, is supplied to the absorber 1003 via a gas introducing line 1007. In the absorber 1003, the flue gas 1001A is brought into counter-current contact with the $CO_2$ absorbent 1002 that is alkanolamine based, for example, in a $CO_2$ absorbing unit 1010, and $CO_2$ contained in the $CO_2$-containing flue gas 1001A is absorbed by the $CO_2$ absorbent 1002 by way of a chemical reaction ($R-NH_2+H_2O+CO_2$ ($R-NH_3HCO_3$). The mist of the $CO_2$ absorbent 1002 accompanying the $CO_2$-reduced flue gas 1001B is then collected by way of a $CO_2$ absorbing unit demister 1011, and the $CO_2$ absorbent 1002 is deposited in a bottom 1012 of the absorber 1003.

The $CO_2$-reduced flue gas 1001B is then washed by being brought into gas-liquid contact with water supplied from the top of the washing unit 1013 in the washing unit 1013. At this time, water supplied from a water tank or water supplied via a washing water supply line 1014, both of which are not illustrated, is used as the water for washing, and is supplied after being cooled in a heat exchanger 1015. The mist accompanying the $CO_2$-reduced flue gas 1001B is removed and collected at a washing unit demister 1016, and $CO_2$-reduced flue gas 1001C having mist removed is released out of the system from a top 1017 of the absorber 1003.

The pressure of the rich solution 1004 accumulated at the bottom 1012 of the absorber 1003 is increased through a rich solution supply line 1018 via a rich solvent pump 1019, heated in a rich/lean solution heat exchanger 1020, and supplied to the regenerator 1005.

The rich solution 1004 released into the regenerator 1005 is heated by steam 1022 from a regenerating heater 1021, releasing a major portion of the $CO_2$ and reducing $CO_2$ concentration to a low level, and the $CO_2$ absorbent 1002 is regenerated as the lean solution 1006. The released $CO_2$ passes through a recovering unit 1023 and a concentrating unit 1024; and $CO_2$ gas 1025 accompanying water vapor is released the exterior, and after the water is condensed and separated in a condenser 1026 and a separation drum 1027, $CO_2$ gas 1028 is released out of the system. The water separated in the separation drum 1027 is supplied to the regenerator 1005 or the absorber 1003 via circulating water supply lines 1031-1 and 1031-2 as circulating water 1030.

The lean solution 1006 is cooled in the rich/lean solution heat exchanger 1020, its pressure is raised by the lean solvent pump 1032, is further cooled in the lean solvent heat exchanger 1033, and then is supplied into the absorber 1003 as the $CO_2$ absorbent 1002.

In a reclaimer 1040, the lean solution 1006 is extracted through a lean solution supply line 1041, and retrograded substances such as salt remaining in the lean solution 1006 are extracted by way of a line 1042 and allowed to react with a basic sodium compound 1043, after which they are discharged as sludge 1044.

In FIG. 10, the $CO_2$ recovery apparatus 1000A may be added afterward so as to recover $CO_2$ emitted from an existing flue gas source, or may be installed together with a newly established flue gas source.

FIGS. 11 and 12 are schematics of other conventional $CO_2$ recovery apparatuses in which a process of supplying $CO_2$ absorbent 1002 is improved. As illustrated in FIG. 11, in another conventional $CO_2$ recovery apparatus 1000B, semi-lean solution (hereinafter, the $CO_2$ absorbent that has released a portion or a major portion of $CO_2$ in the regenerator is referred to as "semi-lean solution") 1051 is extracted at the middle portion of the regenerator 1005 via a semi-lean solution extracting line 1050. The extracted semi-lean solution 1051 is cooled in a rich/semi-lean solution heat exchanger 1052 and a heat exchanger 1053, and then is supplied into the upper side of a lower $CO_2$ absorbing unit 1010-L so as to recover $CO_2$. The $CO_2$ absorbent 1002 extracted from the lower side of an upper $CO_2$ absorbing unit 1010-U is also supplied to the upper side of the lower $CO_2$ absorbing unit 1010-L in the absorber 1003 together with the semi-lean solution 1051 so as to recover $CO_2$ (Patent Document 2).

Furthermore, in another conventional $CO_2$ recovery apparatus 1000C, as illustrated in FIG. 12, the $CO_2$ absorbent 1002-1 and 1002-2, extracted at the middle portion of the $CO_2$ absorbing unit 1010 included in the absorber 1003 via $CO_2$ absorbent extracting lines 1060-1 and 1060-2, respectively, is cooled in heat exchangers 1061-1 and 1061-2, respectively, and then supplied into the absorber 1003 again so as to recover $CO_2$ (Patent Document 3).

In this manner, in operations recovering $CO_2$ by way of the chemical absorption technique, such as those in the conventional $CO_2$ recovery apparatuses 1000A to 1000C, the aqueous amine solution that is the $CO_2$ absorbent 1002 is separated from $CO_2$ by way of high-temperature steam, for example. The process of supplying the $CO_2$ absorbent 1002 is improved, whereby the $CO_2$ recovery efficiency is improved and, the steam (energy) consumption is decreased.

[Patent Document 1] Japanese Patent Laid-open No. H3-193116
[Patent Document 2] Specification in U.S. Pat. No. 6,800,120
[Patent Document 3] Japanese Patent No. 3416443

DISCLOSURE OF INVENTION

Problem to be Solved by the Invention

In the method for absorption-reducing and recovering $CO_2$ from flue gas containing $CO_2$, such as flue gas, using the $CO_2$ absorbent 1002 and the processes described above, the operation cost needs to be reduced as much as possible because these processes are additionally provided in a combustion facility. Because the regenerating process requires a particularly large amount of thermal energy among the processes described above, it is necessary to reduce the energy of steam, thereby achieving the maximum energy savings in the process.

Furthermore, if the conventional $CO_2$ recovery apparatuses 1000A to 1000C become large in size and the amount of recovered $CO_2$ reaches equal to or more than 1000 tons per day, for example, a large amount of thermal energy is consumed in the regenerating process. Therefore, the energy of steam needs to be reduced, thereby achieving energy savings.

In consideration of the issues described above, an object of the present invention is to provide a $CO_2$ recovery apparatus and a $CO_2$ recovery method with improved energy efficiency by allowing the $CO_2$ absorbent to absorb a greater amount of $CO_2$ so as to reduce the mass flow of the circulated $CO_2$ absorbent, and to reduce the amount of steam required in regenerating the $CO_2$ absorbent in the regenerator.

Means for Solving Problem

According to an aspect of the present invention, a $CO_2$ recovery apparatus includes: an absorber that brings flue gas containing $CO_2$ into counter-current contact with $CO_2$ absorbent to reduce $CO_2$; and a regenerator that regenerates rich solution that has absorbed $CO_2$ through heat exchange, in which lean solution having $CO_2$ reduced in the regenerator is reused in the absorber. The absorber includes at least one $CO_2$ absorbing unit that recovers $CO_2$ in the flue gas containing $CO_2$, and the $CO_2$ absorbent that has absorbed $CO_2$ is extracted from a rich side of the $CO_2$ absorbing unit to exterior, cooled, then supplied to a position nearer to a lean side of the absorber with respect to the position at which the $CO_2$ absorbent is extracted, and reused as the $CO_2$ absorbent to recover $CO_2$ so as to increase a $CO_2$ concentration in the $CO_2$ absorbent.

Advantageously, in the $CO_2$ recovery apparatus, the absorber includes two such $CO_2$ absorbing units that are an upper-stage $CO_2$ absorbing unit and a lower-stage $CO_2$ absorbing unit. The $CO_2$ recovery apparatus further includes: an absorbent circulating line through which $CO_2$ absorbent extracted from a rich side of the lower-stage $CO_2$ absorbing unit is supplied to a lean side of the lower-stage $CO_2$ absorbing unit; an absorbent extracting line through which $CO_2$ absorbent extracted from a rich side of the upper-stage $CO_2$ absorbing unit is merged with $CO_2$ absorbent extracted from the rich side of the lower-stage $CO_2$ absorbing unit; and a heat exchanger that is arranged in the absorbent circulating line, and cools the $CO_2$ absorbent extracted from the rich side of the lower-stage $CO_2$ absorbing unit before or after the $CO_2$ absorbent extracted from the rich side of the lower-stage $CO_2$ absorbing unit is merged with the $CO_2$ absorbent extracted via the absorbent extracting line.

Advantageously, in the $CO_2$ recovery apparatus, the absorber includes three such $CO_2$ absorbing units that are an upper-stage $CO_2$ absorbing unit, a middle-stage $CO_2$ absorbing unit, and a lower-stage $CO_2$ absorbing unit. The $CO_2$ recovery apparatus further includes: an absorbent circulating line through which $CO_2$ absorbent extracted from a rich side of the middle-stage $CO_2$ absorbing unit is supplied to a lean side of the middle-stage $CO_2$ absorbing unit; an absorbent extracting line through which $CO_2$ absorbent extracted from a rich side of the upper-stage $CO_2$ absorbing unit is merged with the $CO_2$ absorbent extracted from the rich side of the middle-stage $CO_2$ absorbing unit; and a heat exchanger that is arranged in the absorbent circulating line, and cools the $CO_2$ absorbent extracted from the rich side of the middle-stage $CO_2$ absorbing unit before or after the $CO_2$ absorbent extracted from the rich side of the upper-stage $CO_2$ absorbing unit is merged with the $CO_2$ absorbent extracted via the absorbent extracting line.

Advantageously, the $CO_2$ recovery apparatus, further includes a circulating absorbent extracting line through which a part of the $CO_2$ absorbent extracted from the rich side of the middle-stage $CO_2$ absorbing unit via the absorbent circulating line is supplied to a lean side of the lower-stage $CO_2$ absorbing unit.

Advantageously, in the $CO_2$ recovery apparatus, the absorber includes three such $CO_2$ absorbing units that are an upper-stage $CO_2$ absorbing unit, a middle-stage $CO_2$ absorbing unit, and a lower-stage $CO_2$ absorbing unit. The $CO_2$ recovery apparatus further includes: an absorbent circulating line through which $CO_2$ absorbent extracted from a rich side of the lower-stage $CO_2$ absorbing unit is supplied to a lean side of the middle-stage $CO_2$ absorbing unit; an absorbent extracting line through which $CO_2$ absorbent extracted from a rich side of the upper-stage $CO_2$ absorbing unit is merged with the $CO_2$ absorbent extracted from the rich side of the lower-stage $CO_2$ absorbing unit; and a heat exchanger that is arranged in the absorbent circulating line, and cools the $CO_2$ absorbent extracted from the rich side of the lower-stage $CO_2$ absorbing unit before or after the $CO_2$ absorbent extracted from the rich side of the lower-stage $CO_2$ absorbing unit is merged with the $CO_2$ absorbent extracted via the absorbent extracting line.

Advantageously, in the $CO_2$ recovery apparatus, $CO_2$ absorbent extracted from a rich side of the middle-stage $CO_2$ absorbing unit is supplied to a lean side of the lower-stage $CO_2$ absorbing unit.

Advantageously, the $CO_2$ recovery apparatus, further includes a heat exchanger that cools the $CO_2$ absorbent extracted from the rich side of the middle-stage $CO_2$ absorbing unit.

Advantageously, in the $CO_2$ recovery apparatus, an end of the absorbent extracting line is connected to a rich solution supply line through which the rich solution is supplied to the regenerator, and the rich solution is extracted through the rich solution supply line.

Advantageously, in the $CO_2$ recovery apparatus, a mass flow ratio of a mass flow of the $CO_2$ absorbent supplied to the absorbent circulating line with respect to a mass flow of the rich solution supplied to the rich solution supply line through which the rich solution is supplied to the regenerator is between 0.1 to 1.0 and 6.0 to 1.0.

Advantageously, in the $CO_2$ recovery apparatus, a temperature of the $CO_2$ absorbent extracted from the $CO_2$ absorbing unit after being cooled is 30 to 50 degrees Celsius.

According to another aspect of the present invention, a $CO_2$ recovery method, includes after bringing flue gas containing $CO_2$ into counter-current contact with $CO_2$ absorbent in a $CO_2$ absorbing unit included in an absorber to reduce $CO_2$, regenerating rich solution that has absorbed $CO_2$ in a regenerator, then reusing regenerated lean solution having $CO_2$ reduced in the absorber. The $CO_2$ recovery method includes: extracting the $CO_2$ absorbent that has absorbed $CO_2$ from a rich side of the $CO_2$ absorbing unit to exterior, cooling the same, supplying the same to a position nearer to a lean side of the absorber with respect to the position at which the $CO_2$ absorbent is extracted, and using the same as the $CO_2$ absorbent to recover $CO_2$, thereby increasing a $CO_2$ concentration in the $CO_2$ absorbent.

Advantageously, the $CO_2$ recovery method further includes: extracting the $CO_2$ absorbent from a rich side of a lower-stage $CO_2$ absorbing unit in the absorber including two such $CO_2$ absorbing units that are an upper-stage $CO_2$ absorbing unit and the lower-stage $CO_2$ absorbing unit; merging $CO_2$ absorbent extracted from a rich side of the upper-stage $CO_2$ absorbing unit with the $CO_2$ absorbent extracted from the rich side of the lower-stage $CO_2$ absorbing unit; cooling the $CO_2$ absorbent extracted from the rich side of the lower-stage $CO_2$ absorbing unit before or after the $CO_2$ absorbent extracted from the rich side of the upper-stage $CO_2$ absorbing unit is merged with the $CO_2$ absorbent extracted from the rich side of the lower-stage $CO_2$ absorbing unit; and supplying the $CO_2$ absorbent thus merged to a lean side of the lower-stage $CO_2$ absorbing unit so as to recover $CO_2$ contained in the flue gas containing $CO_2$.

Advantageously, the $CO_2$ recovery method further includes: extracting $CO_2$ absorbent from a rich side of a middle-stage $CO_2$ absorbing unit in the absorber including three such $CO_2$ absorbing units that are an upper-stage $CO_2$ absorbing unit, the middle-stage $CO_2$ absorbing unit, and a lower-stage $CO_2$ absorbing unit; merging $CO_2$ absorbent extracted from a rich side of the upper-stage $CO_2$ absorbing unit with the $CO_2$ absorbent extracted from the rich side of the middle-stage $CO_2$ absorbing unit; cooling the $CO_2$ absorbent extracted from the rich side of the middle-stage $CO_2$ absorbing unit before or after the $CO_2$ absorbent extracted from the rich side of the middle-stage $CO_2$ absorbing unit is merged with the $CO_2$ absorbent extracted from the rich side of the upper-stage $CO_2$ absorbing unit; and supplying the $CO_2$ absorbent thus merged to a lean side of the middle-stage $CO_2$ absorbing unit so as to recover $CO_2$ contained in the gas containing $CO_2$.

Advantageously, the $CO_2$ recovery method further includes supplying a part of the $CO_2$ absorbent extracted from the rich side of the middle-stage $CO_2$ absorbing unit to a lean side of the lower-stage $CO_2$ absorbing unit.

Advantageously, the $CO_2$ recovery method further includes: extracting the $CO_2$ absorbent from a rich side of a lower-stage $CO_2$ absorbing unit in the absorber including three such $CO_2$ absorbing units that are an upper-stage $CO_2$ absorbing unit, a middle-stage $CO_2$ absorbing unit, and the lower-stage $CO_2$ absorbing unit; merging $CO_2$ absorbent extracted from a rich side of the upper-stage $CO_2$ absorbing unit with the $CO_2$ absorbent extracted from the rich side of the lower-stage $CO_2$ absorbing unit; cooling the $CO_2$ absorbent extracted from the rich side of the lower-stage $CO_2$ absorbing unit before or after the $CO_2$ absorbent extracted from the rich side of the upper-stage $CO_2$ absorbing unit is merged with the $CO_2$ absorbent extracted from the rich side of the lower-stage $CO_2$ absorbing unit; and supplying the $CO_2$ absorbent thus merged to a lean side of the middle-stage $CO_2$ absorbing unit so as to recover $CO_2$ contained in the gas containing $CO_2$.

Advantageously, the $CO_2$ recovery method further includes supplying $CO_2$ absorbent extracted from a rich side of the middle-stage $CO_2$ absorbing unit to a lean side of the lower-stage $CO_2$ absorbing unit.

Advantageously, the $CO_2$ recovery method further includes cooling the $CO_2$ absorbent extracted from the rich side of the middle-stage $CO_2$ absorbing unit and thereafter supplying the $CO_2$ absorbent to the lean side of the lower-stage $CO_2$ absorbing unit.

Advantageously, the $CO_2$ recovery method further includes extracting rich solution from a rich solution supply line through which the rich solution is supplied to the regenerator; and circulating the rich solution extracted through the rich solution supply line to the rich side of any one of the upper-stage $CO_2$ absorbing unit, the middle-stage $CO_2$ absorbing unit, and the lower-stage $CO_2$ absorbing unit.

Advantageously, the $CO_2$ recovery method further includes extracting the rich solution, wherein a dividing ratio between a circulation mass flow of the $CO_2$ absorbent extracted from the rich side of the lower-stage $CO_2$ absorbing unit to any one of the upper-stage $CO_2$ absorbing unit, the middle-stage $CO_2$ absorbing unit, and the lower-stage $CO_2$ absorbing unit and a mass flow of the rich solution supplied to the regenerator is between 0.1 to 1.0 and 6.0 to 1.0.

Advantageously, in the $CO_2$ recovery method, a temperature of the $CO_2$ absorbent extracted from the $CO_2$ absorbing unit after being cooled is 30 to 50 degrees Celsius.

Advantageously, in the $CO_2$ recovery method, a mass flow ratio between a mass flow of the rich solution supplied to the regenerator and an amount of absorbent circulation is optimally controlled depending on a gas temperature of flue gas introduced to the absorber so as to reduce operation costs.

Advantageously, in the $CO_2$ recovery method, when the $CO_2$ absorbent has a decreased concentration, an amount of circulation in an entire system is increased to maintain a $CO_2$ absorption capability.

Effect of the Invention

According to the present invention, by extracting the $CO_2$ absorbent that has absorbed $CO_2$ from the rich side of the $CO_2$ absorbing unit in the absorber, cooling the same, and supplying the same to the lean side of the absorber with respect to the position at which the $CO_2$ absorbent is extracted, the amount of $CO_2$ recovered per unit amount of the $CO_2$ absorbent can be increased, and the $CO_2$ concentration in the rich solution at the bottom of the absorber can also be increased. Therefore, the rich solution with a higher $CO_2$ concentration can be supplied to the regenerator, and the mass flow of the $CO_2$ absorbent circulated between the absorber and the regenerator can be reduced. In this manner, the steam required in regenerating the $CO_2$ absorbent and the load of the condenser can be reduced, the thermal energy can be reduced, and energy savings can be achieved.

As a result, further energy savings can be achieved in the process of recovering the $CO_2$ absorbent, even in a large $CO_2$ recovery apparatus that recovers a greater amount of $CO_2$, because the thermal energy can be reduced by supplying the rich solution with a higher $CO_2$ concentration to the regenerator to reduce the amount of steam required in the process of regeneration.

BRIEF DESCRIPTION OF DRAWINGS

FIG. 2 is a schematic of an alternative structure of the $CO_2$ recovery apparatus according to the first embodiment.

FIG. 3A is a schematic of a $CO_2$ recovery apparatus according to a second embodiment of the present invention.

FIG. 6 is a schematic for explaining the difference in the amount of absorbent circulation and a $CO_2$ loading rate between the $CO_2$ recovery apparatus according to the present embodiment and a conventional $CO_2$ recovery apparatus.

FIG. 12 is a schematic of another alternative structure of a conventional $CO_2$ recovery apparatus.

EXPLANATIONS OF LETTERS OR NUMERALS 10A to 10F $CO_2$ recovery apparatus
11 circulating absorbent
11a merged circulating absorbent
12A to 12E absorbent circulating line
13 heat exchanger
14 pump
15A to 15C absorbent extracting line
16 circulating absorbent extracting line
17 heat exchanger
1001A $CO_2$-containing flue gas
1001B, 1001C $CO_2$-reduced flue gas
1002 $CO_2$ absorbent
1002a, 1002b extracted $CO_2$ absorbent
1003 absorber
1004 rich solution
1005 regenerator
1006 lean solution (regenerated solution)
1007 gas introducing line
1010 $CO_2$ absorbing unit
1010-U upper-stage $CO_2$ absorbing unit
1010-M middle-stage $CO_2$ absorbing unit
1010-L lower-stage $CO_2$ absorbing unit
1011 $CO_2$ absorbing unit demister
1012 bottom
1013 washing unit
1014 washing water supply line
1015 heat exchanger
1016 washing unit demister
1017 top
1018 rich solution supply line
1019 rich solvent pump
1020 rich/lean solution heat exchanger
1021 regenerating heater
1022 steam
1023 recovering unit
1024 concentrating unit
1025 $CO_2$ gas
1026 condenser
1027 separation drum
1028 $CO_2$ gas
1030 circulating water
1031-1, 1031-2 circulating water supply line
1032 lean solvent pump
1033 lean solvent heat exchanger
1040 reclaimer
1041 lean solution supply line
1042 lean solution extracting line
1043 basic sodium compound
1044 sludge
1050 semi-lean solution extracting line
1051 semi-lean solution
1052 rich/semi-lean solution heat exchanger
1053 heat exchanger
1060-1, 1060-2 $CO_2$ absorbent extracting line
1061-1, 1061-2 heat exchanger

BEST MODE(S) FOR CARRYING OUT THE INVENTION

The present invention will now be explained in detail with reference to some drawings. Embodiments of the present invention disclosed therein are not intended to limit the scope of the present invention in any way. Furthermore, elements disclosed in the embodiments include those that can be easily thought of by those skilled in the art, and those that are the substantially identical.

First Embodiment

A $CO_2$ recovery apparatus according to a first embodiment of the present invention will now be explained with reference to a drawing.

Figure 1:
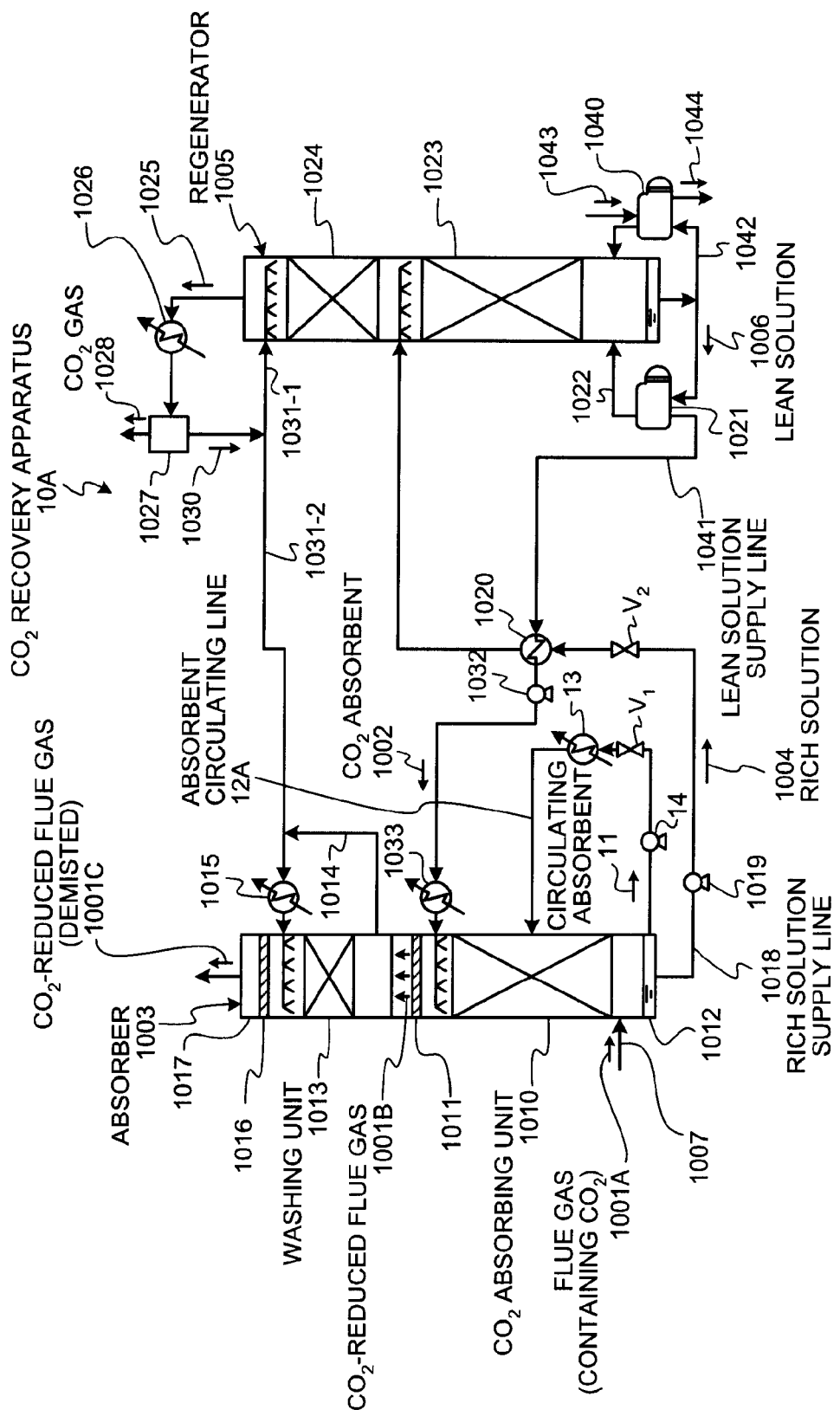
FIG. 1 is a schematic of a $CO_2$ recovery apparatus according to a first embodiment of the present invention.
Figure 10:
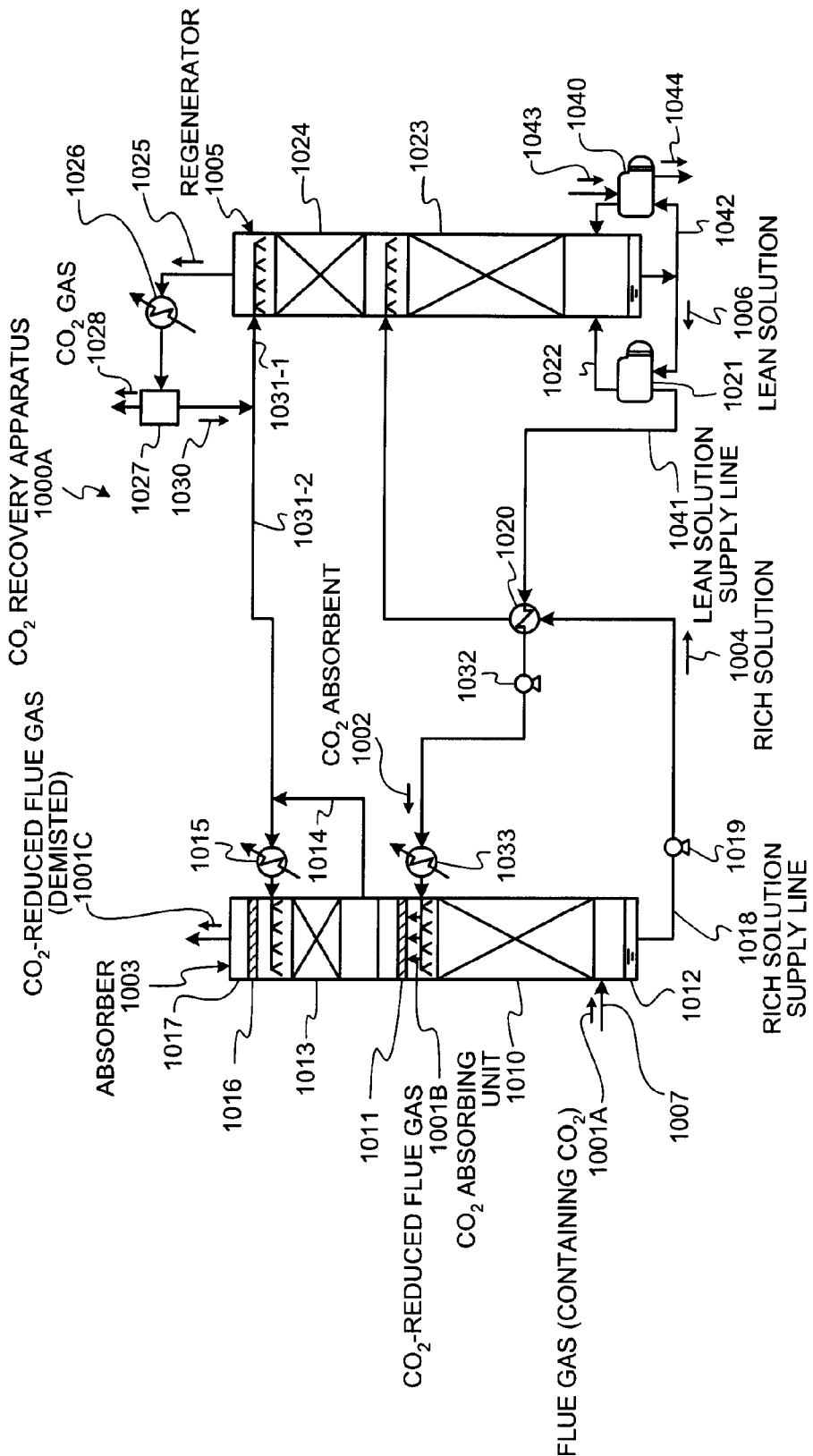
FIG. 10 is a schematic of an example of a structure of a conventional $CO_2$ recovery apparatus.
Figure 11:
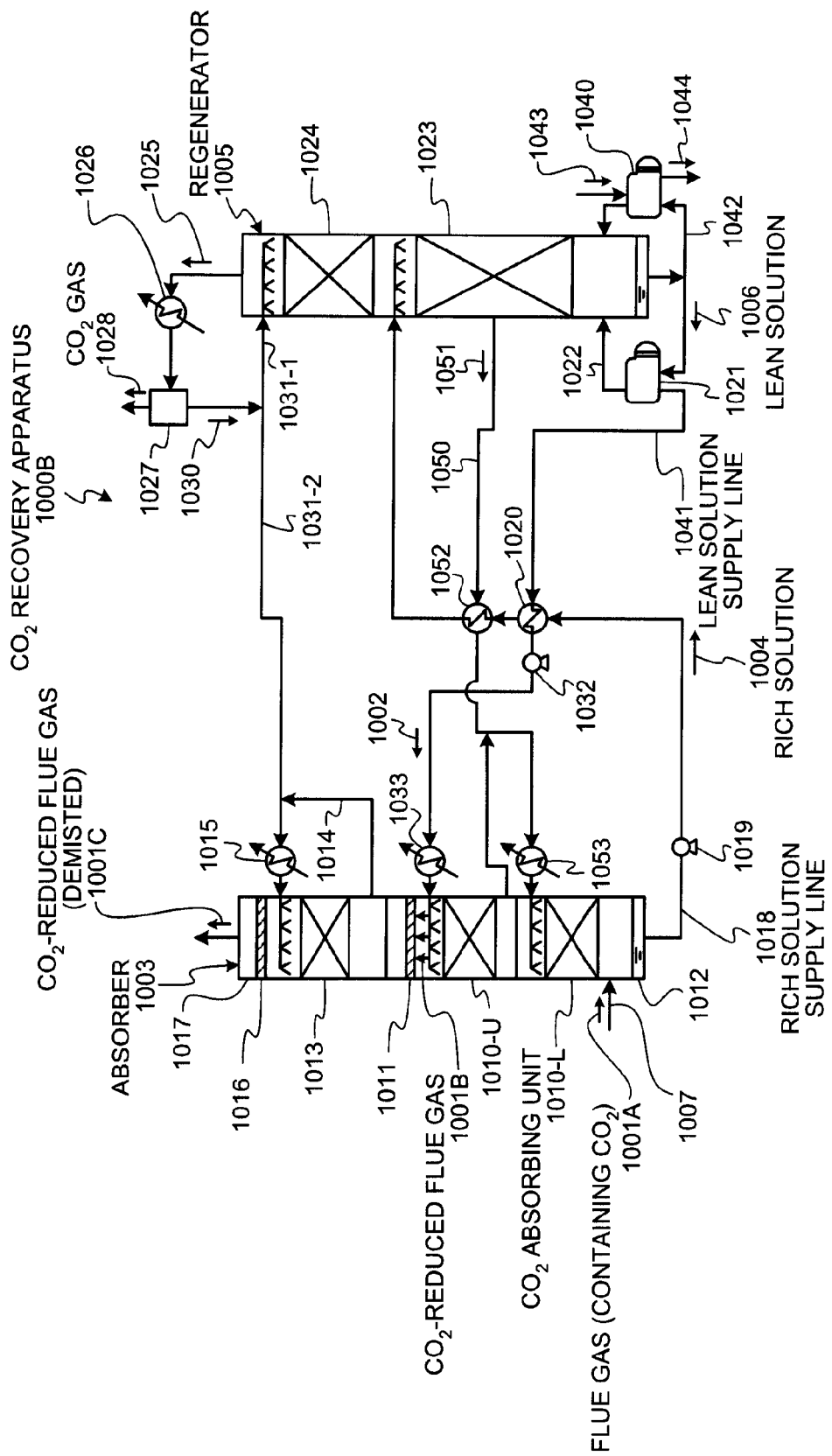
FIG. 11 is a schematic of an alternative structure of a conventional $CO_2$ recovery apparatus.

FIG. 1 is a schematic of the $CO_2$ recovery apparatus according to the first embodiment. The same elements as those included in the $CO_2$ recovery apparatus 1000A illustrated in FIG. 10 are given with the same reference numerals, and redundant explanations thereof are omitted hereunder.

As illustrated in FIG. 1, a $CO_2$ recovery apparatus 10A according to the first embodiment includes: the absorber 1003 in which the $CO_2$-containing flue gas 1001A is brought into counter-current contact with the $CO_2$ absorbent 1002 to reduce $CO_2$, and the regenerator 1005 that regenerates the rich solution 1004 by allowing the rich solution 1004 that has absorbed $CO_2$ to exchange heat. The lean solution (regenerated solution) 1006 having $CO_2$ reduced in the regenerator 1005 is reused in the absorber 1003. The absorber 1003 further includes the $CO_2$ absorbing unit 1010 that recovers $CO_2$ in the $CO_2$-containing flue gas 1001A, and the $CO_2$ absorbent 1002 that has absorbed $CO_2$ is extracted to the exterior from the rich side of the $CO_2$ absorbing unit 1010, cooled, and then supplied to the lean side of the absorber 1003 from the position at which the $CO_2$ absorbent 1002 is extracted.

In the first embodiment, the $CO_2$ absorbent 1002 that has absorbed $CO_2$ and extracted from the lower side of the $CO_2$ absorbing unit 1010 is used as circulating absorbent 11.

In the present invention, the lean side refers to the side that is upstream of the $CO_2$ absorbent 1002 supplied to the $CO_2$ absorbing unit 1010, and, in the first embodiment, refers to the upper side of the $CO_2$ absorbing unit 1010.

The rich side refers to the side that is upstream of the $CO_2$-containing flue gas 1001A supplied to the CO2 absorbing unit 1010, and in this embodiment, refers to the lower side of the $CO_2$ absorbing unit 1010.

The $CO_2$ recovery apparatus 10A according to the first embodiment includes an absorbent circulating line 12A for extracting the $CO_2$ absorbent 1002 that has absorbed $CO_2$ from the lower side of the $CO_2$ absorbing unit 1010 as the circulating absorbent 11, and for supplying the circulating absorbent 11 to the lean side of the $CO_2$ absorbing unit 1010 with respect to the position at which the $CO_2$ absorbent 1002 is extracted in the absorber 1003. By returning the circulating absorbent 11 containing $CO_2$ as the circulating absorbent 11 to the $CO_2$ absorbing unit 1010 as the $CO_2$ absorbent 1002, because the $CO_2$ absorbent 1002 has not reached a saturation level under which $CO_2$ contained in the $CO_2$-containing flue gas 1001A can be absorbed, $CO_2$ contained in the $CO_2$-containing flue gas 1001A can be recovered using the $CO_2$ absorbent 1002 that is still capable of absorbing $CO_2$, and the $CO_2$ concentration in the $CO_2$ absorbent 1002 can be increased.

In addition, in the $CO_2$ recovery apparatus 10A according to the first embodiment, the absorbent circulating line 12A includes a heat exchanger 13 for cooling the circulating absorbent 11 that is extracted from the $CO_2$ absorbing unit 1010 via the absorbent circulating line 12A. When the temperature of the rich solution 1004 rises, the balanced partial pressure increases at the bottom 1012 of the absorber 1003 because the rich solution 1004 contains a large amount of $CO_2$, reducing the capacity of the rich solution 1004 to absorb $CO_2$ contained in the $CO_2$-containing flue gas 1001A. Therefore, by cooling the circulating absorbent 11 in the heat exchanger 13, and supplying the cooled circulating absorbent 11 to the $CO_2$ absorbing unit 1010, the balanced partial pressure of the $CO_2$ absorbent 1002 can be reduced, so that the $CO_2$ absorbent 1002 can absorb more $CO_2$.

The temperature of the circulating absorbent 11 after being cooled in the heat exchanger 13 is preferably 30 to 50 degrees Celsius. This is in order to reduce the balanced partial pressure and to improve the $CO_2$ recovery efficiency of the $CO_2$ absorbent 1002.

The circulating absorbent 11 is extracted by way of a pump 14 arranged in the absorbent circulating line 12A, and the mass flow of the circulating absorbent 11 that is extracted into the absorbent circulating line 12A is adjusted with, for example, a valve V1. The mass flow of the rich solution 1004 that is supplied to the rich solution supply line 1018 is adjusted with, for example, a valve V2. Therefore, the dividing ratio of the mass flow of the rich solution 1004 divided between the absorbent circulating line 12A and to the rich solution supply line 1018 is adjusted by way of the valves V1 and V2.

Furthermore, while in the $CO_2$ recovery apparatus 10A according to the first embodiment, the rich solution 1004 is separately extracted via the absorbent circulating line 12A and the rich solution supply line 1018 at the bottom 1012 of the absorber 1003 in the $CO_2$ recovery apparatus 10A, the present invention is not limited thereto.

For example, as illustrated in FIG. 2, in a $CO_2$ recovery apparatus 10B, an absorbent circulating line 12B may split from the rich solution supply line 1018 that supplies the rich solution 1004 to the regenerator 1005, so as to extract the rich solution 1004 from the rich solution supply line 1018, and the extracted rich solution 1004 may be supplied to the $CO_2$ absorbing unit 1010 as the circulating absorbent 11. Furthermore, while in the $CO_2$ recovery apparatus 10B illustrated in FIG. 2, the rich solution 1004 is extracted through the rich solution supply line 1018 at a position near the bottom 1012 of the absorber 1003, the present invention is not especially limited thereto.

As described above, according to the first embodiment, the $CO_2$ absorbent 1002 that has absorbed $CO_2$ is extracted as the circulating absorbent 11 to the exterior from the lower side of the $CO_2$ absorbing unit 1010 in the absorber 1003, cooled, and then supplied to the lean side of the $CO_2$ absorbing unit 1010 in the absorber 1003. In this manner, the $CO_2$ recovery efficiency in the absorber 1003 is improved, and the amount of $CO_2$ recovered per unit amount of the $CO_2$ absorbent can be increased. As a result, the $CO_2$ concentration in the rich solution 1004 at the bottom 1012 of the absorber 1003 can be increased, and therefore, the rich solution 1004 with a higher $CO_2$ concentration can be supplied to the regenerator 1005, thus reducing the mass flow of the $CO_2$ absorbent 1002 circulated between the absorber 1003 and the regenerator 1005. In this manner, the mass flow of the rich solution 1004 supplied to the regenerator 1005 can be reduced. Therefore, the amount of supplied steam used in regenerating the $CO_2$ absorbent 1002 in the regenerator 1005 can be reduced, and thermal energy consumption can be reduced. In this manner, the energy efficiency can be improved.

As a result, even in a large $CO_2$ recovery apparatus that recovers 1000 tons of $CO_2$ per day, for example, the thermal energy can be reduced by increasing the $CO_2$ concentration in the rich solution 1004 supplied to the regenerator 1005 to reduce the amount of steam required in the regenerator 1005. Thus, further energy savings can be achieved in the process of regenerating the $CO_2$ absorbent 1002.

Furthermore, while in the $CO_2$ recovery apparatus 10A according to the first embodiment, the $CO_2$ absorbent 1002 that has absorbed $CO_2$ is extracted from the lower side of the $CO_2$ absorbing unit 1010 as the circulating absorbent 11, the present invention is not limited thereto, and the $CO_2$ absorbent 1002 that has absorbed $CO_2$ can be extracted to the exterior from the rich side of the $CO_2$ absorbing unit 1010.

The type of the heat exchanger 13 used in the first embodiment is not especially limited, and any known heat exchanger such as a plate heat exchanger, or a shell and tube heat exchanger may be used.

Furthermore, the $CO_2$ absorbent 1002 that can be used in the present invention is not especially limited, and examples thereof include alkanolamines, or hindered amines having an alcoholic hydroxyl group. Examples of such alkanolaminse include monoethanol amine, dinoethanolamine, triethanolamine, methyldiethanolamine, diisopropanolamine, and diglycolamin; however, usually, monoethanolamine (MEA) is preferably used. Examples of hindered amines having an alcoholic hydroxyl group include 2-amino-2-methyl-1-propanol (AMP), 2-(ethylamino)-ethanol (EAE), 2-(methylamino)-ethanol (MAE), and 2-(diethylamino)ethanol (DEAF).

The $CO_2$ absorbent 1002 may be one of these compounds, or a mixture of two or more of these compounds. A basic amine compound is usually used as an aqueous solution with a concentration of 10 to 70 percent by weight. Furthermore, a carbon dioxide absorption promoter or a corrosion inhibitor can be added to the $CO_2$ absorbent 1002, and methanol, polyethyleneglycol, sulfolane, or similar compounds may be added thereto as other agents.

Second Embodiment

A $CO_2$ recovery apparatus according to a second embodiment of the present invention will now be explained with reference to FIGS. 3A and 3B.

Figure 3B:
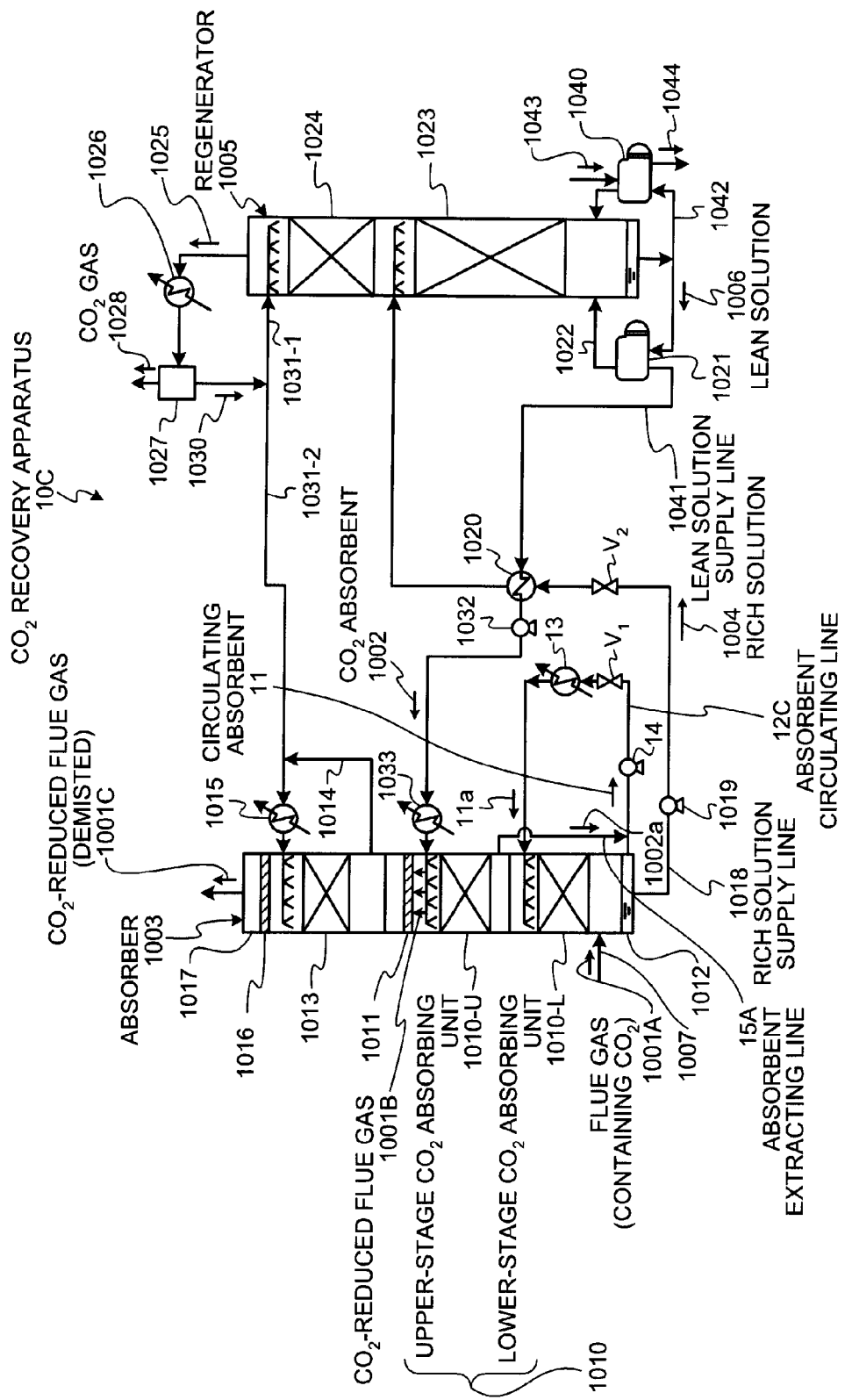
FIG. 3B is a schematic of the $CO_2$ recovery apparatus according to the second embodiment.

FIGS. 3A and 3B are schematics of the $CO_2$ recovery apparatuses according to the second embodiment. The members that are similar to those according to the first embodiment are given with the same reference numerals, and redundant explanations thereof are omitted hereunder.

As illustrated in FIG. 3A, in a $CO_2$ recovery apparatus 10C according to the second embodiment, the absorber 1003 includes two $CO_2$ absorbing unit 1010 that are the upper-stage $CO_2$ absorbing unit 1010-U and the lower-stage $CO_2$ absorbing unit 1010-L, respectively. The absorber 1003 further includes an absorbent circulating line 12C for extracting the $CO_2$ absorbent 1002 from the lower side of the lower-stage $CO_2$ absorbing unit 1010-L as the circulating absorbent 11, and supplying the extracted circulating absorbent 11 to the upper side of the lower-stage $CO_2$ absorbing unit 1010-L; an absorbent extracting line 15A for merging the $CO_2$ absorbent 1002 extracted from the lower side of the upper-stage $CO_2$ absorbing unit 1010-U with the $CO_2$ absorbent 1002 extracted from the lower side of the lower-stage $CO_2$ absorbing unit 1010-L; and the heat exchanger 13 arranged in the absorbent circulating line 12C to cool the circulating absorbent 11 before the circulating absorbent 11 is merged to a $CO_2$ absorbent 1002a extracted via the absorbent extracting line 15A.

In the $CO_2$ recovery apparatus 10C according to the second embodiment, the $CO_2$ absorbent 1002 is extracted from the lower side of the lower-stage $CO_2$ absorbing unit 1010-L$_2$ into the absorbent circulating line 12C as the circulating absorbent 11, and the $CO_2$ absorbent 1002a extracted from the lower side of the upper-stage $CO_2$ absorbing unit 1010-U via the absorbent extracting line 15A is merged with the circulating absorbent 11. The $CO_2$ absorbent 1002a supplied via the absorbent extracting line 15A and merged circulating absorbent 11a are supplied to the upper side of the lower-stage $CO_2$ absorbing unit 1010-L. In this manner, because the $CO_2$ absorbent 1002 has not reached the saturation level under which $CO_2$ contained in the $CO_2$-containing flue gas 1001A can be absorbed, $CO_2$ contained in the $CO_2$-containing flue gas 1001A can be recovered using the $CO_2$ absorbent 1002 that is still capable of absorbing $CO_2$, and the $CO_2$ concentration in the $CO_2$ absorbent 1002 can be increased. In FIG. 3A, the reference numeral 19 denotes a pump inserted to the absorbent extracting line 15A.

Furthermore, in the $CO_2$ recovery apparatus 10C according to the second embodiment, the circulating absorbent 11 extracted from the lower-stage $CO_2$ absorbing unit 1010-L to the absorbent circulating line 12C via the absorbent circulating line 12C is cooled in the heat exchanger 13. By cooling the circulating absorbent 11 in the heat exchanger 13 and supplying the cooled circulating absorbent 11 to the lower-stage $CO_2$ absorbing unit 1010-L, the balanced partial pressure of the $CO_2$ absorbent 1002 can be reduced. Therefore, more $CO_2$ can be absorbed by the $CO_2$ absorbent 1002.

Furthermore, while in the $CO_2$ recovery apparatus 10C according to the second embodiment, the heat exchanger 13 is arranged upstream to the position at which the absorbent circulating line 12C is connected to the absorbent extracting line 15A, the present invention is not limited thereto. For example, as another embodiment in FIG. 3B illustrates, the heat exchanger 13 may be arranged downstream to the position at which the absorbent circulating line 12C is connected to the absorbent extracting line 15A.

By allowing the absorbent 1002a extracted from the upper-stage $CO_2$ absorbing unit 1010-U to fall into the absorbent circulating line 12C near the lower area of the absorber 1003 and to merge, the absorbent 1002a is introduced to the absorbent circulating line 12C under its own weight upon falling, and thus, it becomes unnecessary to force the absorbent 1002a thereto by way of a pump 19 such as the one illustrated in FIG. 3A, thereby allowing the structure of the unit to be simplified.

Furthermore, in the $CO_2$ recovery apparatus 10C according to the second embodiment, the mass flow ratio of the mass flow of the circulating absorbent 11 supplied to the absorbent circulating line 12C with respect to the mass flow of the rich solution 1004 supplied to the rich solution supply line 1018 is set preferably between 0.1 to 1.0 and 6.0 to 1.0, and more preferably between 1.0 to 1.0 and 4.0 to 1.0. This is because the energy required in regenerating the $CO_2$ absorbent 1002 can be reduced by increasing the mass flow of the circulating absorbent 11 supplied to the absorbent circulating line 12C. This is also because, if the ratio of the mass flow of the circulating absorbent 11 supplied to the absorbent circulating line 12C with respect to the mass flow of the rich solution 1004 supplied to the rich solution supply line 1018 is equal to or higher than 4.0 to 1.0, the energy required in regenerating the $CO_2$ absorbent 1002 can hardly be reduced. This is also because, if the mass flow ratio of the mass flow of the circulating absorbent 11 supplied to the absorbent circulating line 12C with respect to the mass flow of the rich solution 1004 supplied to the rich solution supply line 1018 increases to equal to or higher than 6.0 to 1.0, a phenomenon referred to as flooding occurs, in which the level of the $CO_2$ absorbent 1002 rises in the absorber 1003.

Figure 4:
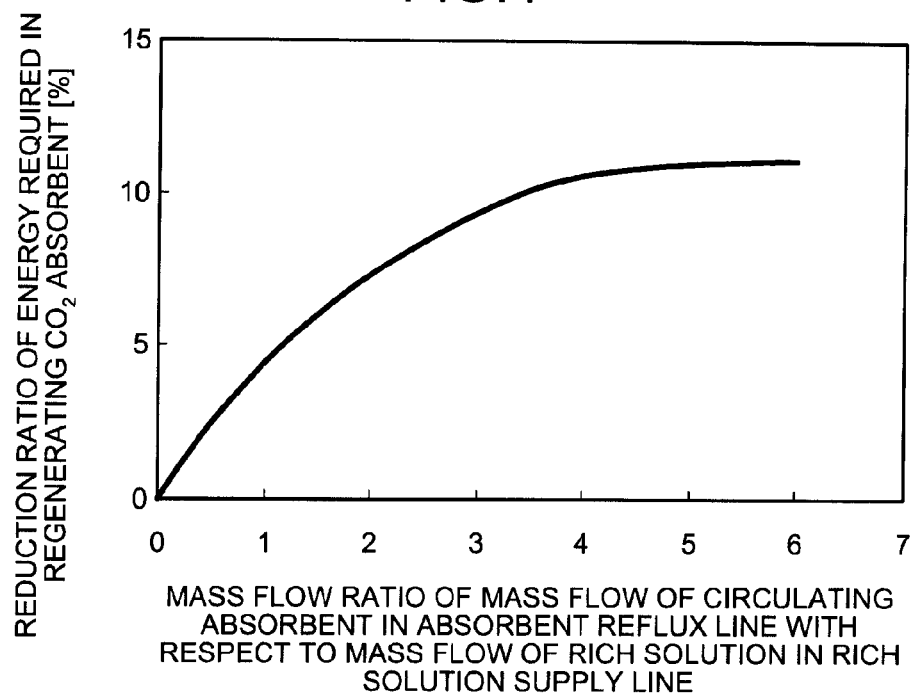
FIG. 4 is a schematic of a relationship between a mass flow of circulating absorbent with respect to a mass flow of rich solution, and the reduction rate of energy required in regenerating the absorbent.

FIG. 4 is a schematic of a relationship between the mass flow ratio of the mass flow of the circulating absorbent supplied to the absorbent circulating line with respect to the mass flow of the rich solution supplied to the rich solution supply line, and a reduction rate of the energy required for absorbent regeneration.

As illustrated in FIG. 4, the increase in the mass flow ratio of the mass flow of the circulating absorbent 11 supplied to the absorbent circulating line 12C with respect to the mass flow of the rich solution 1004 supplied to the rich solution supply line 1018 has lead to the increase in reduction rate in the energy required in absorbent regeneration. Furthermore, when the mass flow of the circulating absorbent 11 supplied to the absorbent circulating line 12C with respect to the ratio of the mass flow of the rich solution 1004 supplied to the rich solution supply line 1018 was set to approximately 1.0, the reduction rate of the energy required in regenerating the $CO_2$ absorbent 1002 was approximately 5.0 percent. When the mass flow of the circulating absorbent 11 supplied to the absorbent circulating line 12C with respect to the mass flow of the rich solution 1004 supplied to the rich solution supply line 1018 was set to approximately 4.0, the reduction rate of the energy required in regenerating the $CO_2$ absorbent 1002 was approximately 10.5 percent. Furthermore, the mass flow of the circulating absorbent 11 supplied to the absorbent circulating line 12C with respect to the mass flow of the rich solution 1004 supplied to the rich solution supply line 1018 was set to approximately between 4.0 and 6.0, the reduction rate of the energy required in regenerating the $CO_2$ absorbent 1002 was approximately 11 percent, and did not increase very much.

Therefore, the mass flow ratio of the mass flow of the circulating absorbent 11 supplied to the absorbent circulating line 12C with respect to the mass flow of the rich solution 1004 supplied to the rich solution supply line 1018 is preferably between 0.1 and 6.0, and more preferably between 1.0 and 4.0.

Upon introducing the flue gas to the absorber 1003, a cooler (not illustrated) installed before the absorber 1003 is used to cool the flue gas 1001A introduced thereto. Depending on the introduction temperature to the absorber 1003, the mass flow ratio of the circulated amount of the circulating absorbent 11 (L2) with respect to the mass flow of the rich solution 1004 supplied to the regenerator 1005 (L1) may be optimally controlled (L2/L1=1.5 to 4.5) so that a reduction in the operation cost is achieved.

Figure 5:
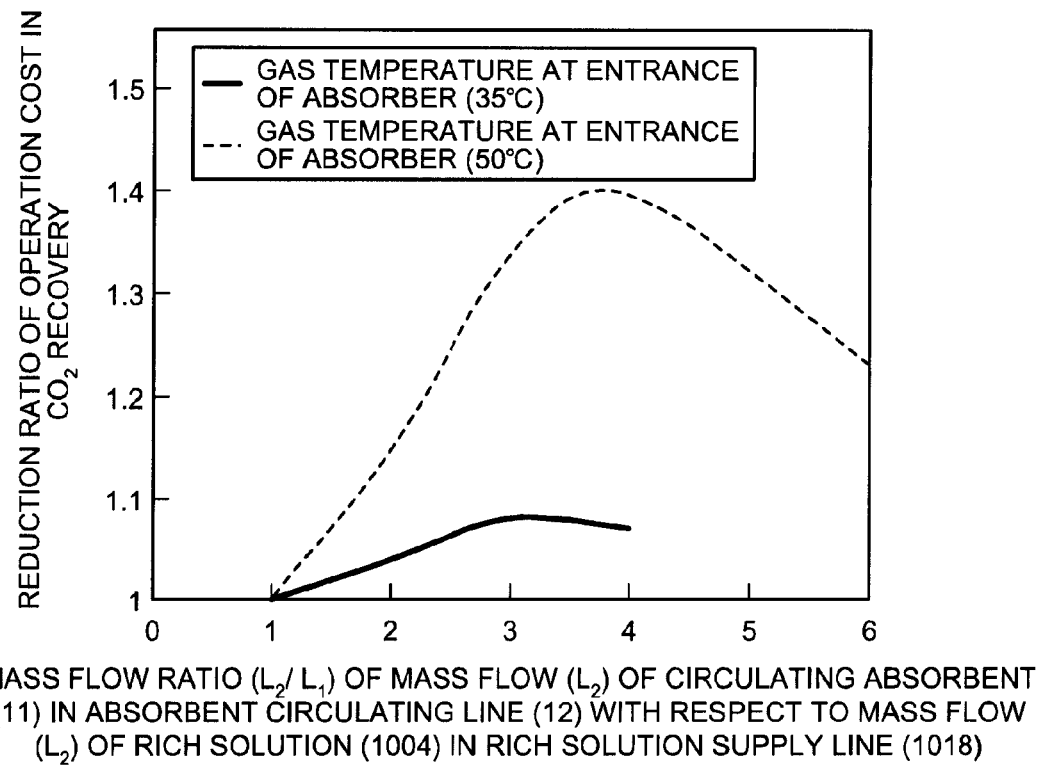
FIG. 5 is a schematic of the mass flow ratio of the mass flow of the circulating absorbent with respect to the mass flow of the rich solution depending on gas temperature, and the rate of reduction in a $CO_2$ recovery operation cost.

FIG. 5 is a schematic of a gas-temperature dependent relationship between the mass flow ratio (L2/L1) of the mass flow of the circulating absorbent 11 in the absorbent circulating line 12A with respect to the mass flow (L1) of the rich solution 1004 supplied to the regenerator, and the reduction rate of the $CO_2$ recovery operation cost depending on temperature.

The solid line in FIG. 5 represents a scenario in which the temperature of the gas introduced into the absorber 100 is low at 35 degrees Celsius, and the dotted line in FIG. 5 represents a scenario in which the temperature of the gas introduced into the absorber 100 is relatively high at 50 degrees Celsius.

As may be obvious from FIG. 5, the optimal mass flow ratio (L2/L1) of the circulated amount (L2) of the circulating absorbent 11 with respect to the mass flow (L1) of the rich solution 1004 supplied to the regenerator 1005 is between 1.5 to 4.0 at 35 degrees Celsius, and the optimal mass flow ratio (L2/L1) of the circulated amount (L2) of the circulating absorbent 11 with respect to the mass flow (L1) of the rich solution 1004 supplied to the regenerator 1005 is between approximately 3.0 to 4.5 at 50 degrees Celsius.

Therefore, by optimizing the amount of circulation depending on the temperature of the gas introduced to the absorber 1003, the running costs can further be reduced.

Furthermore, in a scenario where the concentration of the $CO_2$ absorbent declines as a result of extended operation, a predetermined amount of $CO_2$ can constantly be recovered by increasing the amount of the circulation in the entire system to maintain the $CO_2$ absorption capacity.

The temperature of the rich solution 1004 at the bottom 1012 of the absorber 1003, the amount of the circulation of the $CO_2$ absorbent 1002 circulated between the $CO_2$ absorber 1003 and the regenerator 1005, and a $CO_2$ loading rate of the absorbent 1002 recovering $CO_2$ with the use of the $CO_2$ recovery apparatus 10C according to the second embodiment will now be explained using FIG. 5.

FIG. 6 is a schematic for explaining the amount of the circulation of the $CO_2$ absorbent circulated between the absorber and the regenerator, and the $CO_2$ loading rate in each of the $CO_2$ recovery apparatus 10C according to the second embodiment and the conventional $CO_2$ recovery apparatus such as the one illustrated in FIG. 10.

Furthermore, in FIG. 6, a test using the $CO_2$ recovery apparatus 10C according to the second embodiment is denoted as a test example 1, and a test using the conventional $CO_2$ recovery apparatus 1000A such as the one illustrated in FIG. 10 is denoted as a comparative example 1.

Furthermore, in the test example 1, the mass flow ratio of the mass flow of the circulating absorbent 11 supplied to the absorbent circulating line 12C with respect to the mass flow of the rich solution 1004 supplied to the rich solution supply line 1018 was set to approximately 4.0.

As illustrated in FIG. 6, the test example 1 using the $CO_2$ recovery apparatus 10C according to the second embodiment, such as the one illustrated in FIG. 3A, demonstrated that the temperature of the rich solution 1004 at the bottom 1012 of the absorber 1003 decreased by approximately 7 degrees Celsius, in comparison with the comparative example 1 using the conventional $CO_2$ recovery apparatus 1000A such as the one illustrated in FIG. 10.

Furthermore, assuming that the amount of the circulation of the $CO_2$ absorbent 1002 between the absorber 1003 and the regenerator 1005 in the comparative example 1 using the conventional $CO_2$ recovery apparatus 1000A, such as the one illustrated in FIG. 10, is 1.0 (reference value), the mass flow rate of the amount of circulation of the $CO_2$ absorbent 1002 between the absorber 1003 and the regenerator 1005 in the test example 1 using the $CO_2$ recovery apparatus 10C according to the second embodiment, such as the one illustrated in FIG. 3, with respect to that in the comparative example 1 using the conventional $CO_2$ recovery apparatus 1000A, such as the one illustrated in FIG. 10, was 0.91.

The amount of recovered $CO_2$ can be obtained from the value of the amount of the circulation of the $CO_2$ absorbent 1002 between the absorber 1003 and the regenerator 1005, the value of the $CO_2$ concentration in the rich solution 1004, and the value of the $CO_2$ concentration in the lean solution 1006, as indicated by formula (1):

$$\Delta CO_2 = L \times (CR - CL) \tag{1}$$

Where, the amount of recovered $CO_2$ is denoted as $\Delta CO_2$; the amount of the circulation of the $CO_2$ absorbent between the absorber and the regenerator is denoted as L; the $CO_2$ concentration in the rich solution is denoted as CR; and the $CO_2$ concentration in the lean solution is denoted as CL.

In other words, assuming that a predetermined amount of $CO_2$ is to be recovered, because the lean solution 1006 is the solution regenerated as the $CO_2$ absorbent 1002 and the $CO_2$ concentration CL in the lean solution 1006 is constant, if the $CO_2$ concentration CR in the rich solution 1004 increases, the difference between the $CO_2$ concentration in the rich solution 1004 and that in the lean solution 1006 "CR–CL" increases correspondingly based on formula (1). Therefore, the amount of the circulation L of the $CO_2$ absorbent 1002 circulated between the absorber 1003 and the regenerator 1005 required for recovering a predetermined amount of $CO_2$ can be reduced.

Therefore, when the mass flow ratio of the mass flow of the circulating absorbent 11 supplied to the absorbent circulating line 12C with respect to the mass flow of the rich solution 1004 supplied to the rich solution supply line 1018 is approximately 4.0, because the mass flow ratio of the amount of the circulation of the $CO_2$ absorbent 1002 between the absorber 1003 and the regenerator 1005 in the test example 1, in which the $CO_2$ recovery apparatus 10C according to the second embodiment such as the one illustrated in FIG. 3 is used, with respect to that in the comparative example 1, in which the conventional $CO_2$ recovery apparatus 1000A such as the one illustrated in FIG. 10 is used, is 0.91 percent, the $CO_2$ recovery apparatus 10C according to the second embodiment, such as the one illustrated in FIG. 3A, achieves a reduction of 10 percent in the amount of the circulation of the $CO_2$ absorbent 1002 between the absorber 1003 and the regenerator 1005, in comparison with a scenario in which the conventional $CO_2$ recovery apparatus 1000A, such as the one illustrated in FIG. 10, is used.

Furthermore, assuming that the $CO_2$ loading rate of the $CO_2$ absorbent 1002 recovering $CO_2$ in the conventional $CO_2$ recovery apparatus 1000A, such as the one illustrated in FIG. 10, is 1.0 (reference value), the $CO_2$ loading rate in the $CO_2$ recovery apparatus 10C according to the second embodiment was 1.08, with respect to that in the conventional $CO_2$ recovery apparatus 1000A.

Therefore, when the mass flow ratio of the mass flow of the circulating absorbent 11 supplied to the absorbent circulating line 12C with respect to the mass flow of the rich solution 1004 supplied to the rich solution supply line 1018 is approximately 4.0, the $CO_2$ recovery apparatus 10C according to the second embodiment can increase the $CO_2$ loading ratio, with respect to that achieved by the conventional $CO_2$ recovery apparatus 1000A such as the one illustrated in FIG. 10. Therefore, by using the $CO_2$ recovery apparatus 10C according to the second embodiment, such as the one illustrated in FIG. 3A, the amount of $CO_2$ recovered by the rich solution 1004 can be increased, and the $CO_2$ concentration in the rich solution 1004 can also be increased, in comparison with a scenario in which the conventional $CO_2$ recovery apparatus 1000A, such as the one illustrated in FIG. 10, is used.

Furthermore, in these tests, the temperature of the rich solution 1004 at the bottom 1012 of the absorber 1003 was set to approximately 44 degrees Celsius. However, the $CO_2$ loading rate in the $CO_2$ recovery apparatus 10C according to the second embodiment can be increased to, for example, approximately 1.2 with respect to that achieved in the conventional $CO_2$ recovery apparatus 1000A, by decreasing the temperature of the rich solution 1004 at the bottom 1012 of the absorber 1003.

Furthermore, while in the $CO_2$ recovery apparatus 10C according to the second embodiment, each of the $CO_2$ absorbing units 1010, the upper-stage $CO_2$ absorbing unit 1010-U and the lower-stage $CO_2$ absorbing unit 1010-L included in the absorber 1003 are the same in size, the present invention is not limited thereto, and the lower-stage $CO_2$ absorbing unit 1010-L and the upper-stage $CO_2$ absorbing unit 1010-U may be different in size.

Figure 7:
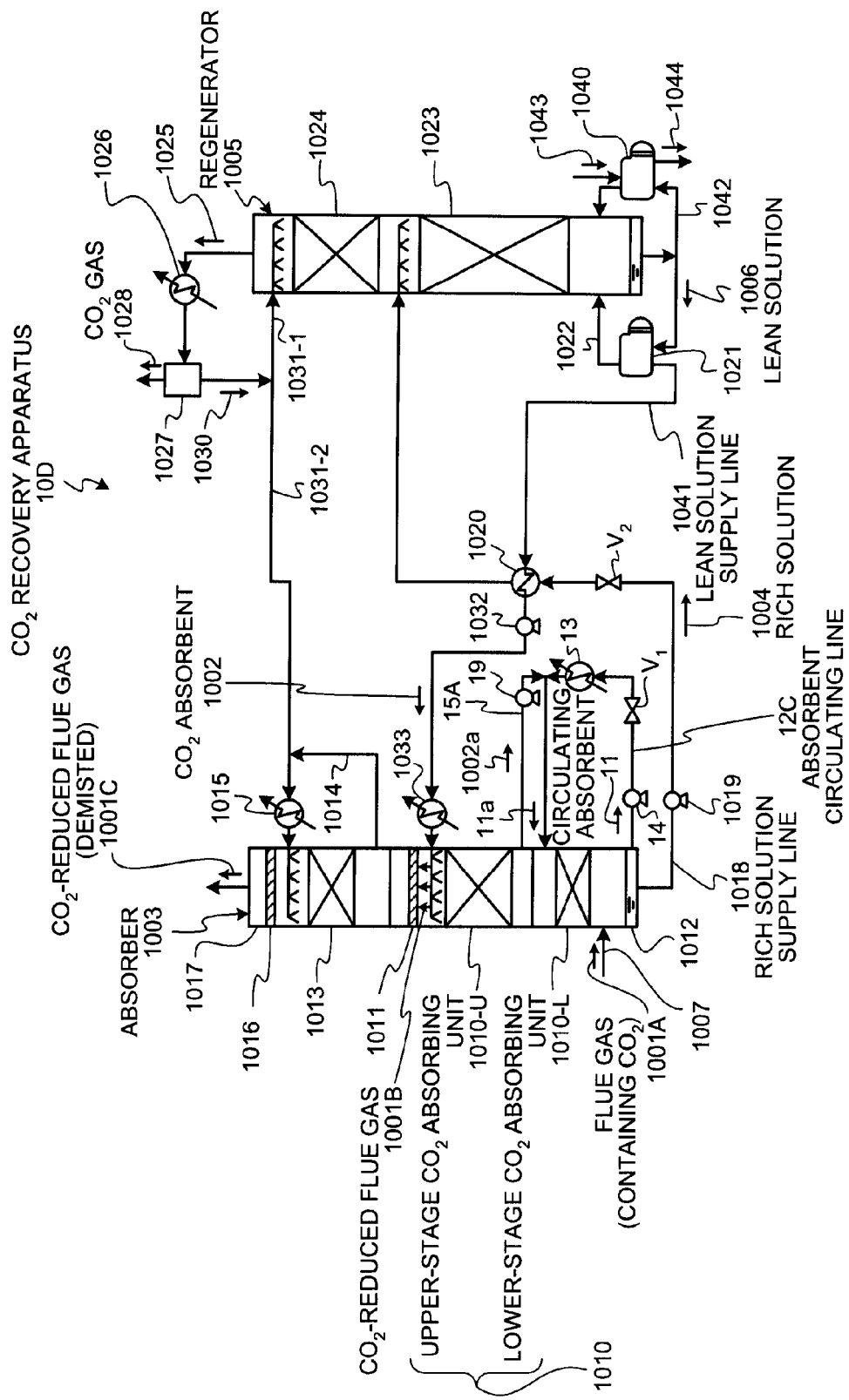
FIG. 7 is a schematic of an alternative structure of the $CO_2$ recovery apparatus according to the second embodiment of the present invention.

For example, as illustrated in FIG. 7, the capacity of the upper-stage $CO_2$ absorbing unit 1010-U may be double that of the lower-stage $CO_2$ absorbing unit 1010-L, so that $CO_2$ contained in the $CO_2$-containing flue gas 1001A is recovered effectively in the upper-stage $CO_2$ absorbing unit 1010-U into which the lean solution 1006 is supplied directly.

As described above, according to the second embodiment, because the $CO_2$ absorbent 1002 is extracted from the lower side of the lower-stage $CO_2$ absorbing unit 1010-L in the absorber 1003 as the circulating absorbent 11, cooled, and then supplied to the upper side of the lower-stage $CO_2$ absorbing unit 1010-L, the $CO_2$ recovery efficiency of the absorber 1003 can be improved, and the amount of $CO_2$ recovered per unit amount of the $CO_2$ absorbent can be increased. As a result, because the $CO_2$ concentration in the rich solution 1004 at the bottom 1012 of the absorber 1003 can be increased, the rich solution 1004 with a higher $CO_2$ concentration can be supplied to the regenerator 1005, and the mass flow of the $CO_2$ absorbent 1002 circulated between the absorber 1003 and the regenerator 1005 can be reduced. In this manner, because the mass flow of the rich solution 1004 supplied to the regenerator 1005 can be reduced, the amount of the supplied steam that is used in regenerating the $CO_2$ absorbent 1002 in the regenerator 1005 can be reduced, to further reduce thermal energy consumption and to improve the energy efficiency.

Third Embodiment

A $CO_2$ recovery apparatus according to a third embodiment of the present invention will now be explained with reference to FIG. 8.

Figure 8:
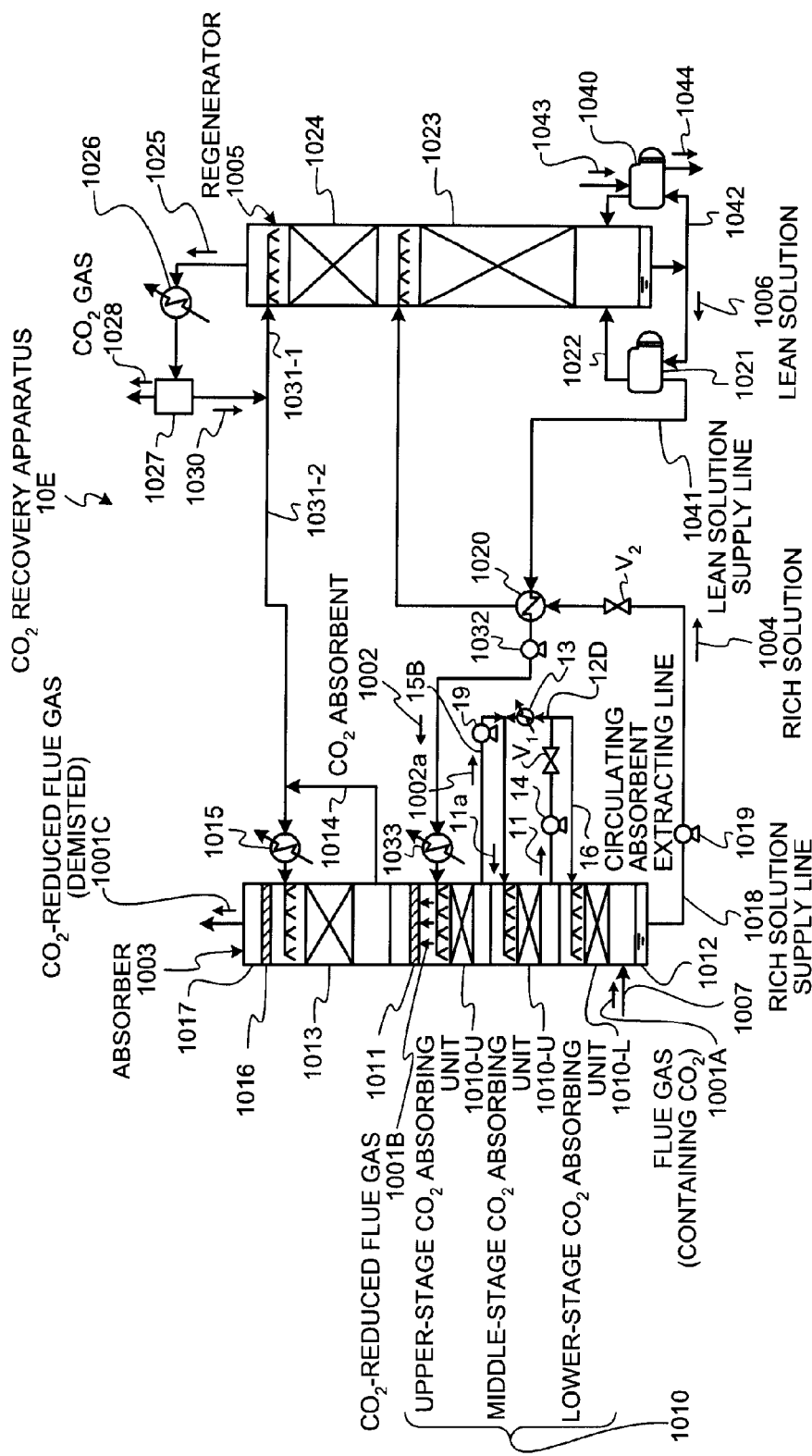
FIG. 8 is a schematic of a $CO_2$ recovery apparatus according to a third embodiment of the present invention.

FIG. 8 is a schematic of the $CO_2$ recovery apparatus according to the third embodiment. The members that are similar to those according to the first embodiment are given with the same reference numerals, and redundant explanations thereof are omitted hereunder.

As illustrated in FIG. 8, in a $CO_2$ recovery apparatus 10E according to the third embodiment, the absorber 1003 includes: three $CO_2$ absorbing units 1010 that are the upper-stage $CO_2$ absorbing unit 1010-U, a middle-stage $CO_2$ absorbing unit 1010-M, and the lower-stage $CO_2$ absorbing unit 1010-L; an absorbent circulating line 12D for extracting the $CO_2$ absorbent 1002 from the lower side of the middle-stage $CO_2$ absorbing unit 1010-M as the circulating absorbent 11, and for supplying the extracted circulating absorbent 11 to the upper side of the middle-stage $CO_2$ absorbing unit 1010-M; an absorbent extracting line 15B for merging the $CO_2$ absorbent 1002a extracted from the lower side of the upper-stage $CO_2$ absorbing unit 1010-U with the circulating absorbent 11; and the heat exchanger 13 arranged in the absorbent circulating line 12D to cool the circulating absorbent 11 before the circulating absorbent 11 is merged with the $CO_2$ absorbent 1002a extracted via the absorbent extracting line 15B.

In the $CO_2$ recovery apparatus 10E according to the third embodiment, the $CO_2$ absorbent 1002 is extracted from the lower side of the middle-stage $CO_2$ absorbing unit 1010-M as the circulating absorbent 11 in the absorber 1003, and the $CO_2$ absorbent 1002a extracted from the lower side of the upper-stage $CO_2$ absorbing unit 1010-U via absorbent extracting line 15B is merged with the circulating absorbent 11, and circulating absorbent 11a that is the circulating absorbent 11 thus merged is supplied to the upper side of the middle-stage $CO_2$ absorbing unit 1010-M. Because the merged circulating absorbent 11a has not reached the saturation level under which $CO_2$ contained in the $CO_2$-containing flue gas 1001A can be absorbed, $CO_2$ contained in the $CO_2$-containing flue gas 1001A can be recovered using the circulating absorbent 11a as the $CO_2$ absorbent 1002 that is still capable of absorbing $CO_2$, and the $CO_2$ concentration in the $CO_2$ absorbent 1002 can be increased.

Furthermore, in the $CO_2$ recovery apparatus 10E according to the third embodiment, the circulating absorbent 11 extracted from the middle-stage $CO_2$ absorbing unit 1010-M into the absorbent circulating line 12D via the absorbent circulating line 12D is cooled in the heat exchanger 13, and the cooled circulating absorbent 11 is supplied to the $CO_2$ absorbing unit 1010.

Furthermore, in the $CO_2$ recovery apparatus 10E according to the third embodiment, the absorbent circulating line 12D includes a circulating absorbent extracting line 16 for supplying a part of the circulating absorbent 11 into the upper side of the lower-stage $CO_2$ absorbing unit 1010-L. Because the circulating absorbent 11 has not reached the saturation level under which $CO_2$ contained in the $CO_2$-containing flue gas 1001A can be absorbed, by supplying a part of the circulating absorbent 11 to the upper side of the lower-stage $CO_2$ absorbing unit 1010-L via the circulating absorbent extracting line 16, the $CO_2$ absorbent 1002 is allowed to absorb more $CO_2$, thereby recovering as much $CO_2$ as possible up to the amount that the $CO_2$ absorbent 1002 is capable of absorbing $CO_2$ in the $CO_2$-containing flue gas 1001A. Therefore, the $CO_2$ absorbent 1002 is allowed to absorb more $CO_2$, and thus, the $CO_2$ concentration in the $CO_2$ absorbent 1002 can be further increased.

Therefore, according to the third embodiment, the $CO_2$ absorbent 1002 is extracted from the lower side of the middle-stage $CO_2$ absorbing unit 1010-M in the absorber 1003 as the circulating absorbent 11, cooled, and then supplied to the upper side of the middle-stage $CO_2$ absorbing unit 1010-M; and a part of the circulating absorbent 11 is supplied to the upper side of the lower-stage $CO_2$ absorbing unit 1010-L via the circulating absorbent extracting line 16. In this manner, the $CO_2$ recovery efficiency of the absorber 1010 is further improved, and the amount of $CO_2$ recovered per unit amount of the $CO_2$ absorbent can be further increased. As a result, because the $CO_2$ concentration in the rich solution 1004 at the bottom 1012 of the absorber 1003 can be further increased, the rich solution 1004 with a further increased $CO_2$ concentration can be supplied to the regenerator 1005, and the mass flow of the $CO_2$ absorbent 1002 circulated between the absorber 1003 and the regenerator 1005 can be reduced. In this manner, because the mass flow of the rich solution 1004 supplied to the regenerator 1005 can be reduced, the amount of the supplied steam used in regenerating the $CO_2$ absorbent 1002 in the regenerator 1005 can be reduced, thereby reducing thermal energy consumption. In this manner, the energy efficiency can be further improved.

Furthermore, while in the $CO_2$ recovery apparatus 10E according to the third embodiment, the circulating absorbent 11 extracted via the absorbent circulating line 12D is supplied to the upper side of the middle-stage $CO_2$ absorbing unit 1010-M, the present invention is not limited thereto, and the circulating absorbent 11 may be supplied to the upper side of the upper-stage $CO_2$ absorbing unit 1010-U, or the circulating absorbent 11 may be supplied to both of the upper-stage $CO_2$ absorbing unit 1010-U and the middle-stage $CO_2$ absorbing unit 1010-M.

Fourth Embodiment

A $CO_2$ recovery apparatus according to a fourth embodiment of the present invention will now be explained with reference to FIG. 9.

Figure 9:
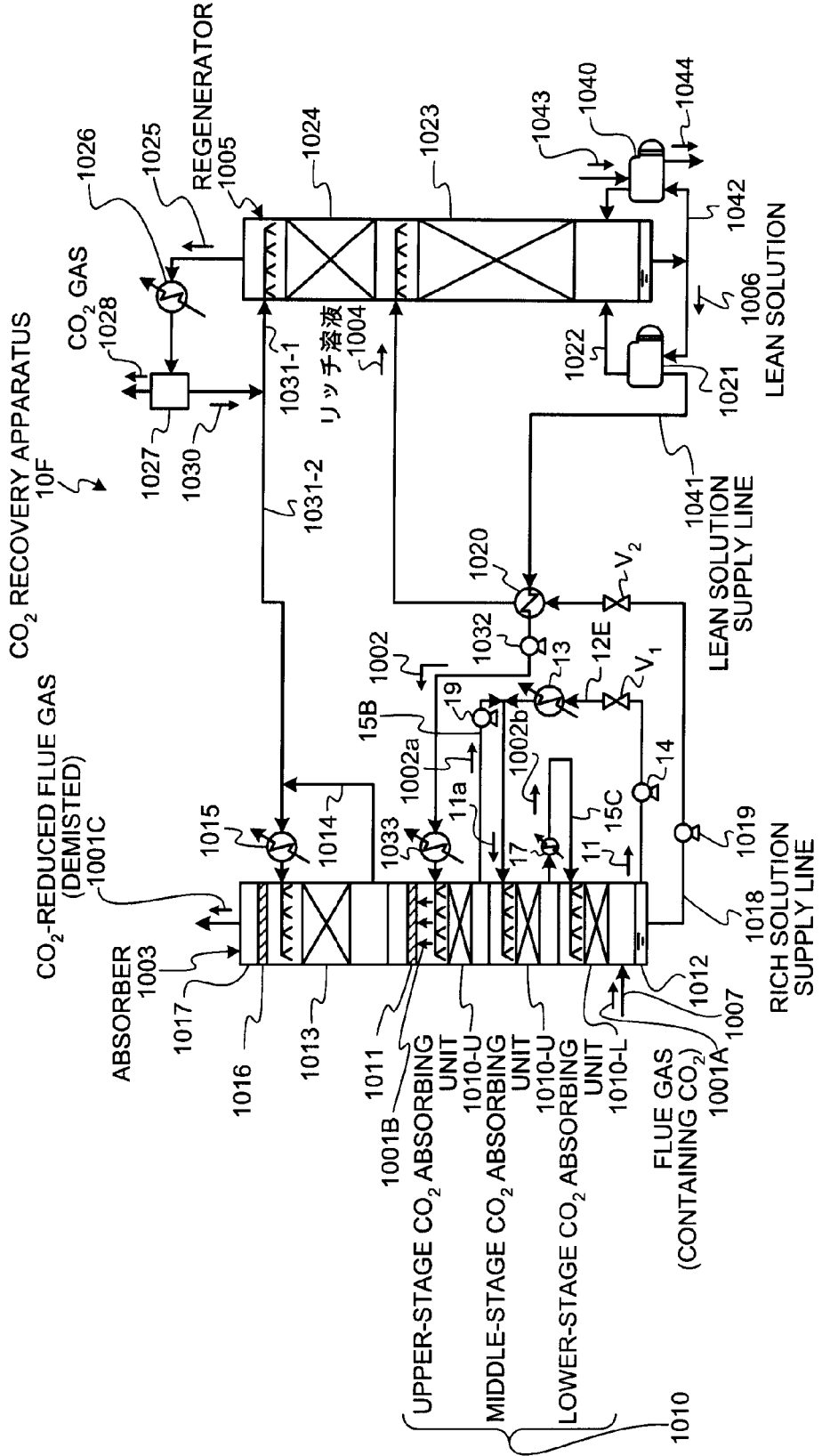
FIG. 9 is a schematic of a $CO_2$ recovery apparatus according to a fourth embodiment of the present invention.

FIG. 9 is a schematic of the $CO_2$ recovery apparatus according to the fourth embodiment. The members that are similar to those according to the first embodiment are given the same reference numerals, and redundant explanations thereof are omitted hereunder.

As illustrated in FIG. 9, in a $CO_2$ recovery apparatus 10F according to the fourth embodiment, the position from which the $CO_2$ absorbent 1002 is extracted in the absorber 1003 is changed to the lower side of the lower-stage $CO_2$ absorbing unit 1010-L, from the lower side of the middle-stage $CO_2$ absorbing unit 1010-M in the $CO_2$ recovery apparatus 10E according to the third embodiment illustrated in FIG. 8.

In other words, the $CO_2$ recovery apparatus 10F according to the fourth embodiment includes an absorbent circulating line 12E for extracting the $CO_2$ absorbent 1002 from the lower side of the lower-stage $CO_2$ absorbing unit 1010-L as the circulating absorbent 11, and for supplying the extracted circulating absorbent 11 to the upper side of the middle-stage $CO_2$ absorbing unit 1010-M, instead of the absorbent circulating line 12D included in the $CO_2$ recovery apparatus 10E according to the third embodiment illustrated in FIG. 8.

In the $CO_2$ recovery apparatus 10F according to the fourth embodiment, the $CO_2$ absorbent 1002 is extracted from the lower side of the lower-stage $CO_2$ absorbing unit 1010-L as the circulating absorbent 11; the $CO_2$ absorbent 1002a extracted from the lower side of the upper-stage $CO_2$ absorbing unit 1010-U via the absorbent extracting line 15B is merged with the circulating absorbent 11; and the merged circulating absorbent 11a is supplied to the upper side of the middle-stage $CO_2$ absorbing unit 1010-M. Because the merged circulating absorbent 11a has not reached the saturation level under which $CO_2$ contained in the $CO_2$-containing flue gas 1001A can be absorbed, by using the merged circulating absorbent 11a as the $CO_2$ absorbent 1002 that is still capable of absorbing $CO_2$, $CO_2$ contained in the $CO_2$-containing flue gas 1001A can be recovered, and the $CO_2$ concentration in the $CO_2$ absorbent 1002 can be increased.

Furthermore, the $CO_2$ recovery apparatus 10F according to the fourth embodiment includes an absorbent extracting line 15C for extracting $CO_2$ absorbent 1002b from the lower side of the middle-stage $CO_2$ absorbing unit 1010-M, and for supplying extracted $CO_2$ absorbent 1002b to the upper side of the lower-stage $CO_2$ absorbing unit 1010-L. Because the $CO_2$ absorbent 1002b has not reached the saturation level under which $CO_2$ contained in the $CO_2$-containing flue gas 1001A can be absorbed, by returning the $CO_2$ absorbent 1002b containing $CO_2$ to the absorber 1003, the $CO_2$ contained in the $CO_2$-containing flue gas 1001A can be recovered using the $CO_2$ absorbent 1002b that is still capable of absorbing $CO_2$, and the $CO_2$ concentration in the $CO_2$ absorbent 1002 can be increased.

Furthermore, in the $CO_2$ recovery apparatus 10F according to the fourth embodiment, the absorbent extracting line 15C includes a heat exchanger 17 for cooling the $CO_2$ absorbent 1002. The $CO_2$ absorbent 1002b extracted from the middle-stage $CO_2$ absorbing unit 1010-M to the absorbent extracting line 15C through the absorbent extracting line 15C is cooled in the heat exchanger 17, and the cooled $CO_2$ absorbent 1002b is supplied to the lower-stage $CO_2$ absorbing unit 1010-L. By supplying the cooled $CO_2$ absorbent 1002 to the lower-stage $CO_2$ absorbing unit 1010-L, the balanced partial pressure of the $CO_2$ absorbent 1002 can be decreased. Therefore, the $CO_2$ absorbent 1002 is allowed to absorb more $CO_2$ in the lower-stage $CO_2$ absorbing unit 1010-L.

Therefore, according to the fourth embodiment, the $CO_2$ absorbent 1002 is extracted from the lower side of the lower-stage $CO_2$ absorbing unit 1010-L in the absorber 1003 as the circulating absorbent 11, cooled, and then supplied to the upper side of the middle-stage $CO_2$ absorbing unit 1010-M in the absorber 1003. The $CO_2$ absorbent 1002b extracted from the lower side of the middle-stage $CO_2$ absorbing unit 1010-M via the absorbent extracting line 15C is cooled, and the cooled $CO_2$ absorbent 1002b is again supplied to the $CO_2$ absorbing unit 1010. In this manner, the $CO_2$ recovery efficiency of the absorber 1003 is further improved, and the amount of $CO_2$ recovered per unit amount of the $CO_2$ absorbent can be further increased. As a result, because the $CO_2$ concentration in the rich solution 1004 at the bottom 1012 of the absorber 1003 can be further in increased, the rich solution 1004 with a higher $CO_2$ concentration can be supplied to the regenerator 1005. Thus, the mass flow of the $CO_2$ absorbent 1002 circulated between the absorber 1003 and the regenerator 1005 can be reduced. In this manner, because the mass flow of the rich solution 1004 supplied to the regenerator 1005 can be reduced, the amount of the supplied steam used in regenerating the $CO_2$ absorbent 1002 in the regenerator 1005 can be reduced, thereby reducing the thermal energy consumption. In this manner, the energy efficiency can be further improved.

Furthermore, while in the $CO_2$ recovery apparatus 10F according to the fourth embodiment, the circulating absorbent 11 extracted through the absorbent circulating line 12E is supplied to the upper side of the middle-stage $CO_2$ absorbing unit 1010-M, the present invention is not limited thereto, and the circulating absorbent 11 may be supplied to the upper side of the upper-stage $CO_2$ absorbing unit 1010-U, or the circulating absorbent 11 may be supplied to both of the upper-stage $CO_2$ absorbing unit 1010-U and the middle-stage $CO_2$ absorbing unit 1010-M.

As described above, the $CO_2$ recovery apparatus according to the present invention eliminates the need for replacing the conventional $CO_2$ recovery apparatus and installing a new $CO_2$ recovery apparatus by simply providing the absorbent extracting line through which the $CO_2$ absorbent 1002 that has absorbed $CO_2$ on the rich side is extracted to the exterior and circulated to the lean side of the absorber 1003 to a conventional $CO_2$ recovery apparatus. Furthermore, depending on the number of stages in the $CO_2$ absorbing units 1010 included in the absorber 1003, the absorbent extracting line should be designed so as to extract the $CO_2$ absorbent 1002 that has absorbed $CO_2$ from the rich side to the exterior as required, and to allow the same to be circulated to the lean side of the absorber 1003. In this manner, by improving the $CO_2$ recovery efficiency of the absorber 1003, and increasing the $CO_2$ concentration in the rich solution 1004, the rich solution 1004 with a higher $CO_2$ concentration can be supplied to the regenerator 1005, so that the amount of the circulation of the $CO_2$ absorbent 1002 between the absorber 1003 and the regenerator 1005 can be reduced. Therefore, by reducing the mass flow of the rich solution 1004 that is supplied to the regenerator 1005, the amount of the steam required in regenerating the $CO_2$ absorbent 1002 can be reduced, thereby reducing the thermal energy consumption. In this manner, the energy efficiency can be improved.

Thus, in a large $CO_2$ recovery apparatus that recovers equal to or more than 1000 tons per day, for example, simply by including the absorbent extracting line for extracting the $CO_2$ absorbent 1002 and allowing the same to be circulated to the lean side of the absorber 1003 in the conventional $CO_2$ recovery apparatus, the $CO_2$ concentration in the rich solution 1004 supplied to the regenerator 1005 can be increased, and the amount of the steam required in the regenerator 1005 can be reduced, thereby reducing the thermal energy, such that further energy savings can be achieved in the process of regenerating the $CO_2$ absorbent 1002.

INDUSTRIAL APPLICABILITY

As described above, because the $CO_2$ recovery apparatus and the $CO_2$ recovery method according to the present invention can increase the $CO_2$ concentration in the rich solution discharged from the bottom of the absorber, and reduce the mass flow of the $CO_2$ absorbent circulating between the absorber and the regenerator, the amount of the steam required in regenerating the $CO_2$ absorbent can be reduced, and the thermal energy can be reduced. Accordingly, when the amount of $CO_2$ recovered by the $CO_2$ recovery apparatus increases, by increasing the $CO_2$ concentration in the rich solution, the amount of the steam required in regeneration can be reduced upon regenerating the $CO_2$ absorbent, in spite of the increase in the amount of recovered $CO_2$. Thus, the $CO_2$ recovery apparatus and the $CO_2$ recovery method according to the present invention are suited for a $CO_2$ recovery apparatus and $CO_2$ recovery control that provides energy savings.

The invention claimed is:

1. A $CO_2$ recovery apparatus comprising:
    an absorber that brings flue gas containing $CO_2$ into counter-current contact with $CO_2$ absorbent to reduce $CO_2$;
    a regenerator that regenerates rich solution that has absorbed $CO_2$ through heat exchange, in which lean solution having $CO_2$ reduced in the regenerator is reused in the absorber, wherein
    the absorber includes at least one $CO_2$ absorbing unit that recovers $CO_2$ in the flue gas containing $CO_2$; a washing unit arranged above the at least one $CO_2$ absorbing unit within the absorber; and a water supplying apparatus configured to supply the washing unit with water from a top thereof;
    a lean-solution supplying apparatus that is connected to a position between the washing unit and the absorbing unit, and configured to supply the absorber with the lean solution regenerated from the rich solution in the regenerator; and
    an absorbent circulating line connecting a lower side of the $CO_2$ absorbing unit to a position between the upper side of the $CO_2$ absorbing unit and the lower side of the $CO_2$ absorbing unit without passing through the regenerator, the absorbent circulating line being arranged separately from the lean-solution supplying apparatus, and having a pump that extracts the $CO_2$ absorbent and a heat exchanger that cools the $CO_2$ absorbent extracted from the absorber and circulating in the absorbent circulating line.

2. The $CO_2$ recovery apparatus according to claim 1, wherein
    the $CO_2$ absorbing unit includes an upper-stage $CO_2$ absorbing unit and a lower-stage $CO_2$ absorbing unit, and the $CO_2$ recovery apparatus further comprises:
    an absorbent extracting line through which CO2 absorbent is extracted from a lower side of the upper-stage CO2 absorbing unit, wherein
    the absorbent circulating line connects a lower side of the lower-stage $CO_2$ absorbing unit and an upper side of the lower-stage $CO_2$ absorbing unit to supply the lower-stage $CO_2$ absorbing unit with the $CO_2$ absorbent extracted from the lower side of the lower-stage $CO_2$ absorbing unit merged with the $CO_2$ absorbent extracted from the lower side of the upper-stage $CO_2$ absorbing unit, and
    the heat exchanger cools the $CO_2$ absorbent extracted from the lower side of the lower-stage $CO_2$ absorbing unit before or after the $CO_2$ absorbent extracted from the lower side of the lower-stage $CO_2$ absorbing unit is merged with the $CO_2$ absorbent extracted via the absorbent extracting line.

3. The $CO_2$ recovery apparatus according to claim 1, wherein
    the $CO_2$ absorbing unit includes an upper-stage $CO_2$ absorbing unit, a middle-stage $CO_2$ absorbing unit, and a lower-stage $CO_2$ absorbing unit, and the $CO_2$ recovery apparatus further comprises:
    an absorbent extracting line through which $CO_2$ absorbent is extracted from a lower side of the upper-stage $CO_2$ absorbing unit, wherein
    the absorbent circulating line connects a lower side of the middle-stage $CO_2$ absorbing unit and the upper side of the middle-stage $CO_2$ absorbing unit to supply the middle-stage $CO_2$ absorbing unit with the $CO_2$ absorbent extracted from the lower side of the middle-stage $CO_2$ absorbing unit merged with the $CO_2$ absorbent extracted from the lower side of the upper-stage $CO_2$ absorbing unit, and
    the heat exchanger cools the $CO_2$ absorbent extracted from the lower side of the middle-stage $CO_2$ absorbing unit before or after the $CO_2$ absorbent extracted from the rich side of the upper-stage $CO_2$ absorbing unit is merged with the $CO_2$ absorbent extracted via the absorbent extracting line.

4. The $CO_2$ recovery apparatus according to claim 3, further comprising a circulating absorbent extracting line through which a part of the $CO_2$ absorbent extracted from the lower side of the middle-stage $CO_2$ absorbing unit via the absorbent circulating line is supplied to an upper side of the lower-stage $CO_2$ absorbing unit.

5. The $CO_2$ recovery apparatus according to claim 1, wherein
the $CO_2$ absorbing unit includes an upper-stage $CO_2$ absorbing unit, a middle-stage $CO_2$ absorbing unit, and a lower-stage $CO_2$ absorbing unit, and the $CO_2$ recovery apparatus further comprises:
an absorbent extracting line through which $CO_2$ absorbent extracted from a lower side of the upper-stage $CO_2$ absorbing unit, wherein
the absorbent circulating line connects the lower side of the lower-stage $CO_2$ absorbing unit and the upper side of the middle-stage $CO_2$ absorbing unit to supply the middle-stage $CO_2$ absorbing unit with the $CO_2$ absorbent extracted from the lower side of the lower-stage $CO_2$ absorbing unit merged with the $CO_2$ absorbent extracted from the lower side of the upper-stage $CO_2$ absorbing unit, and
the heat exchanger cools the $CO_2$ absorbent extracted from the lower side of the lower-stage $CO_2$ absorbing unit before the $CO_2$ absorbent extracted from the lower side of the lower-stage $CO_2$ absorbing unit is merged with the $CO_2$ absorbent extracted via the absorbent extracting line.

6. The $CO_2$ recovery apparatus according to claim 5, wherein $CO_2$ absorbent extracted from a lower side of the middle-stage $CO_2$ absorbing unit is supplied to an upper side of the lower-stage $CO_2$ absorbing unit.

7. The $CO_2$ recovery apparatus according to claim 6, further comprising a heat exchanger that cools the $CO_2$ absorbent extracted from the lower side of the middle-stage $CO_2$ absorbing unit.

8. The $CO_2$ recovery apparatus according to claim 2, wherein an end of the absorbent extracting line is connected to a rich solution supply line through which the rich solution is supplied to the regenerator, and the rich solution is extracted through the rich solution supply line.

9. The $CO_2$ recovery apparatus according to claim 2, wherein the absorbent circulating line is configured to be supplied with a mass flow of the $CO_2$ absorbent having a mass flow ratio between 0.1 to 6.0 with respect to a mass flow of the rich solution supplied to the rich solution supply line through which the rich solution is supplied to the regenerator.

10. The $CO_2$ recovery apparatus according to claim 1, wherein the heat exchanger is configured to cool the $CO_2$ absorbent extracted from the $CO_2$ absorbing unit to a temperature of 30 to 50 degrees Celsius.

11. A $CO_2$ recovery method comprising the steps of: bringing flue gas containing $CO_2$ into counter-current contact with $CO_2$ absorbent in a $CO_2$ absorbing unit included in an absorber to reduce $CO_2$;
supplying a regenerator with rich solution of the $CO_2$ absorbent that has absorbed $CO_2$ and regenerating the rich solution therein into lean solution having $CO_2$ reduced;
supplying the absorber with the lean solution and reusing therein the lean solution;
washing $CO_2$-reduced flue gas by bringing the $CO_2$-reduced flue gas into counter-current contact with water supplied from a top of a washing unit arranged above the $CO_2$ absorbing unit within the absorber;
supplying the absorber with the lean solution regenerated from the rich solution in the regenerator to a position between the washing unit and the absorbing unit;
extracting the $CO_2$ absorbent that has absorbed $CO_2$ as circulating absorbent from a lower side of the $CO_2$ absorbing unit to exterior;
cooling the circulating absorbent;
supplying the lean solution to a position between the washing unit and the absorbing unit;
supplying the circulating absorbent to a position between the upper side of the $CO_2$ absorbing unit and the lower side of the $CO_2$ absorbing unit without passing through the regenerator; and
circulating the circulating absorbent separately from the lean solution through an absorbent circulating line having a pump that extracts the $CO_2$ absorbent and a heat exchanger that cools the $CO_2$ absorbent extracted from the absorber.

12. The $CO_2$ recovery method according to claim 11, further comprising:
extracting the $CO_2$ absorbent from a lower side of a lower-stage $CO_2$ absorbing unit in the absorber including two such $CO_2$ absorbing units that are an upper-stage $CO_2$ absorbing unit and the lower-stage $CO_2$ absorbing unit;
merging $CO_2$ absorbent extracted from a lower side of the upper-stage $CO_2$ absorbing unit with the $CO_2$ absorbent extracted from the lower side of the lower-stage $CO_2$ absorbing unit;
cooling the $CO_2$ absorbent extracted from the lower side of the lower-stage $CO_2$ absorbing unit before or after the $CO_2$ absorbent extracted from the lower side of the upper-stage $CO_2$ absorbing unit is merged with the $CO_2$ absorbent extracted from the lower side of the lower-stage $CO_2$ absorbing unit; and
supplying the $CO_2$ absorbent thus merged to an upper side of the lower-stage $CO_2$ absorbing unit so as to recover $CO_2$ contained in the flue gas containing $CO_2$.

13. The $CO_2$ recovery method according to claim 11, further comprising:
extracting $CO_2$ absorbent from a lower side of a middle-stage $CO_2$ absorbing unit in the absorber wherein the $CO_2$ absorbing unit comprises an upper-stage $CO_2$ absorbing unit, the middle-stage $CO_2$ absorbing unit, and a lower-stage $CO_2$ absorbing unit;
merging $CO_2$ absorbent extracted from a lower side of the upper-stage $CO_2$ absorbing unit with the $CO_2$ absorbent extracted from the lower side of the middle-stage $CO_2$ absorbing unit;
cooling the $CO_2$ absorbent extracted from the lower side of the middle-stage $CO_2$ absorbing unit before or after the $CO_2$ absorbent extracted from the lower side of the middle-stage $CO_2$ absorbing unit is merged with the $CO_2$ absorbent extracted from the lower side of the upper-stage $CO_2$ absorbing unit; and
supplying the $CO_2$ absorbent thus merged to an upper side of the middle-stage $CO_2$ absorbing unit so as to recover $CO_2$ contained in the gas containing $CO_2$.

14. The $CO_2$ recovery method according to claim 13, further comprising supplying a part of the $CO_2$ absorbent extracted from the lower side of the middle-stage $CO_2$ absorbing unit to an upper side of the lower-stage $CO_2$ absorbing unit.

15. The $CO_2$ recovery method according to claim 11, further comprising:

extracting the $CO_2$ absorbent from a lower side of a lower-stage $CO_2$ absorbing unit in the absorber wherein the $CO_2$ absorbing unit comprises an upper-stage $CO_2$ absorbing unit, a middle-stage $CO_2$ absorbing unit, and the lower-stage $CO_2$ absorbing unit;

merging $CO_2$ absorbent extracted from a lower side of the upper-stage $CO_2$ absorbing unit with the $CO_2$ absorbent extracted from the lower side of the lower-stage $CO_2$ absorbing unit;

cooling the $CO_2$ absorbent extracted from the lower side of the lower-stage $CO_2$ absorbing unit before or after the $CO_2$ absorbent extracted from the lower side of the upper-stage $CO_2$ absorbing unit is merged with the $CO_2$ absorbent extracted from the lower side of the lower-stage $CO_2$ absorbing unit; and supplying the $CO_2$ absorbent thus merged to an upper side of the middle-stage $CO_2$ absorbing unit so as to recover $CO_2$ contained in the gas containing $CO_2$.

16. The $CO_2$ recovery method according to claim 15, further comprising supplying $CO_2$ absorbent extracted from a lower side of the middle-stage $CO_2$ absorbing unit to an upper side of the lower-stage $CO_2$ absorbing unit.

17. The $CO_2$ recovery method according to claim 16, further comprising cooling the $CO_2$ absorbent extracted from the lower side of the middle-stage $CO_2$ absorbing unit and thereafter supplying the $CO_2$ absorbent to the upper side of the lower-stage $CO_2$ absorbing unit.

18. The $CO_2$ recovery method according to claim 12, further comprising:

extracting rich solution from a rich solution supply line through which the rich solution is supplied to the regenerator; and circulating the rich solution extracted through the rich solution supply line to the lower side of any one of the upper-stage $CO_2$ absorbing unit, the middle-stage $CO_2$ absorbing unit, and the lower-stage $CO_2$ absorbing unit.

19. The $CO_2$ recovery method according to claim 12, further comprising extracting the rich solution, wherein a dividing ratio between a circulation mass flow of the $CO_2$ absorbent extracted from the lower side of the lower-stage $CO_2$ absorbing unit to any one of the upper-stage $CO_2$ absorbing unit, the middle-stage $CO_2$ absorbing unit, and the lower-stage $CO_2$ absorbing unit and a mass flow of the rich solution supplied to the regenerator is between 0.1 to 1.0 and 6.0 to 1.0.

20. The $CO_2$ recovery method according to claim 12, wherein a temperature of the $CO_2$ absorbent extracted from the $CO_2$ absorbing unit after being cooled is 30 to 50 degrees Celsius.

21. The $CO_2$ recovery method according to claim 11, wherein a mass flow ratio between a mass flow of the rich solution supplied to the regenerator and an amount of absorbent circulation is optimally controlled depending on a gas temperature of flue gas introduced to the absorber so as to reduce operation costs.

22. The $CO_2$ recovery method according to claim 21, wherein, when the $CO_2$ absorbent has a decreased concentration thereof as a result of extended operation, an amount of circulation in an entire system is increased to maintain a $CO_2$ absorption capability.

* * * * *